(12) United States Patent
Orii et al.

(10) Patent No.: US 7,774,173 B2
(45) Date of Patent: Aug. 10, 2010

(54) MODEL PARAMETER DETERMINING METHOD IN A SIMULATION BY APPLYING A QUANTIFIER ELIMINATION ALGORITHM

(75) Inventors: Shigeo Orii, Kawasaki (JP); Hirokazu Anai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 461 days.

(21) Appl. No.: 10/953,115

(22) Filed: Sep. 30, 2004

(65) Prior Publication Data

US 2005/0159935 A1 Jul. 21, 2005

(30) Foreign Application Priority Data

Sep. 30, 2003 (JP) ............................. 2003-341753
Sep. 1, 2004 (JP) ............................. 2004-254903

(51) Int. Cl.
 G06F 7/60 (2006.01)
(52) U.S. Cl. ........................................... 703/2
(58) Field of Classification Search .................... 703/2, 703/11, 12
See application file for complete search history.

(56) References Cited

U.S. PATENT DOCUMENTS

2003/0033126 A1* 2/2003 Lincoln et al. ................ 703/11
2003/0059792 A1* 3/2003 Palsson et al. ................. 435/6
2004/0220786 A1* 11/2004 Tiwari et al. .................. 703/2

FOREIGN PATENT DOCUMENTS

JP 11-328239 11/1999
JP 2004-38618 2/2004

OTHER PUBLICATIONS

Jirstrand, 1997 Academic Press Limited., Nonlinear Control System Design by Quantifier Elimination. pp. 137-152.*
Basu., 1997 IEEE, An Improved Algorithm for Quantifier Elimination over Real Closed Fields., pp. 56-65.*
Brown., 2003 Japan Society for Symbolic and Algebraic Computation., An Overview of QEPCAD B: a Tool for Real Quantifier Elimination and Formula Simplification. pp. 13-22.*
Chen et al., Jun. 7, 2003, In Silico biology 3Quantitative Petri net model of gene regulated metabolic networks in the cell., p. 1-16.*

(Continued)

*Primary Examiner*—Paul L Rodriguez
*Assistant Examiner*—Eunhee Kim
(74) *Attorney, Agent, or Firm*—Staas & Halsey LLP

(57) ABSTRACT

A model parameter determination program stored in a storage medium used to direct a computer to efficiently and effectively determine a parameter of a model in a simulation, and includes a step of receiving input of data of a variable in a model of a system to be analyzed; a step of generating a constraint expression relating to a parameter of a model based on the received data and the model of the system; and a step of obtaining presence/absence of a solution and/or a possible range of a feasible parameter by applying a quantifier elimination algorithm to the constraint expression.

14 Claims, 21 Drawing Sheets

OTHER PUBLICATIONS

Ratschan et al. May 11, 2001., http://www.arXiv:cs/0105021v1., Solving Composed First-Order Constraints from Discrete—Time Robust Control. p. 1-11.*

Caviness, B. and Johnson, J., "Quantifier Elimination and Cylindrical Algebraic Decomposition", Texts and Monographs in Symbolic Computation, 1998, Springer-VerlagWein, New York.

Japanese Office Action issued Aug. 18, 2009 in corresponding Japanese Application No. 2004-254903.

Japanese Office Action issued on Jun. 2, 2009 in corresponding Japanese Patent Application 2004-254903.

Hirokazu Anai, "Control Theory and Computer Algebra", Instruments and Control, The society of Instrument and Control Engineers, vol. 37, No. 12, pp. 863-869, Dec. 10, 1998.

Hirokazu Anai, Shinji Hara, "Robust control system design by quantifier elimination", Systems/Control/Information, Institute of Systems, Control, and Information Engineers, vol. 44, No. 6, pp. 13-17, Jun. 15, 2000.

Hirokazu Anai, "Quantifier elimination-algorithm implementation and application", Formula Manipulation, Japan Society for Symbolic and Algebraic Computation, vol, 10, No. 1, pp. 3-12, Aug. 2003.

* cited by examiner

Quantifier Elimination (QE)

Input: first-order formula
- Polynomial equations, inequalities, inequations
- quantifiers [$\exists, \forall$], Boolean operations[$\wedge, \vee, \neg, \Rightarrow$, etc]

Output: an equivalent quantifier-free formula
- Possible regions of unquantified variables as semi-algebraic sets
  ( if all variables are quantified → *true* or *false* )

Example: $\exists x \ (x^2 + bx + c = 0)$   $\xrightarrow{QE}$   $b^2 - 4c \geq 0$

FIG. 3

Constraint Solving via QE 

- Constraint solving problem: ($\geq, >, =, \neq$)

Find $x_1, \cdots, x_n$ s.t. $\{f_i(x_1, \cdots, x_n) \,\square\, 0, \quad i = 1, \cdots, s\}$

- QE problem:

$\exists x_1 \cdots \exists x_n \left( f_1(x_1, \cdots, x_n) \,\square\, 0 \,\wedge\, \cdots \,\wedge\, f_s(x_1, \cdots, x_n) \,\square\, 0 \right)$

- Output:

Feasibility (true or false) / Feasible regions (equivalent quantifier-free formula)

- Advantages:
    - Arbitrary Boolean combinations (instead of simply conjunctions)
    - Strict inequalities; $>, \neq$
    - Parametric  (coefficients of $x_i$ are polynomial in parameters)
    - Nonlinear  ($x_i$ ; arbitrary degree, products)
    - Exact solution (infeasibility, feasible solutions)

FIG. 4A

Constraint Solving via QE

Example1: $\exists x \exists y$ [ $1 < x < 10 \;\wedge\; y > 0 \;\wedge\; 6xy > 0 \;\wedge\; xy - 2 > 0 \;\wedge$
$(xy-2)(2+4x-2xy) - 6xy > 0$ ]

⇒ true          Sample value: $(x,y)=(5,1)$

Example2: $\exists x$ [ $1 < x < 10 \;\wedge\; y > 0 \;\wedge\; 6xy > 0 \;\wedge\; xy - 2 > 0 \;\wedge$
$(xy-2)(2+4x-2xy) - 6xy > 0$ ]

⇒ $50y^2 - 100y + 21 < 0 \;\wedge\; y > 0$ i.e. $y \in (0.24, 1.76)$

FIG. 4B

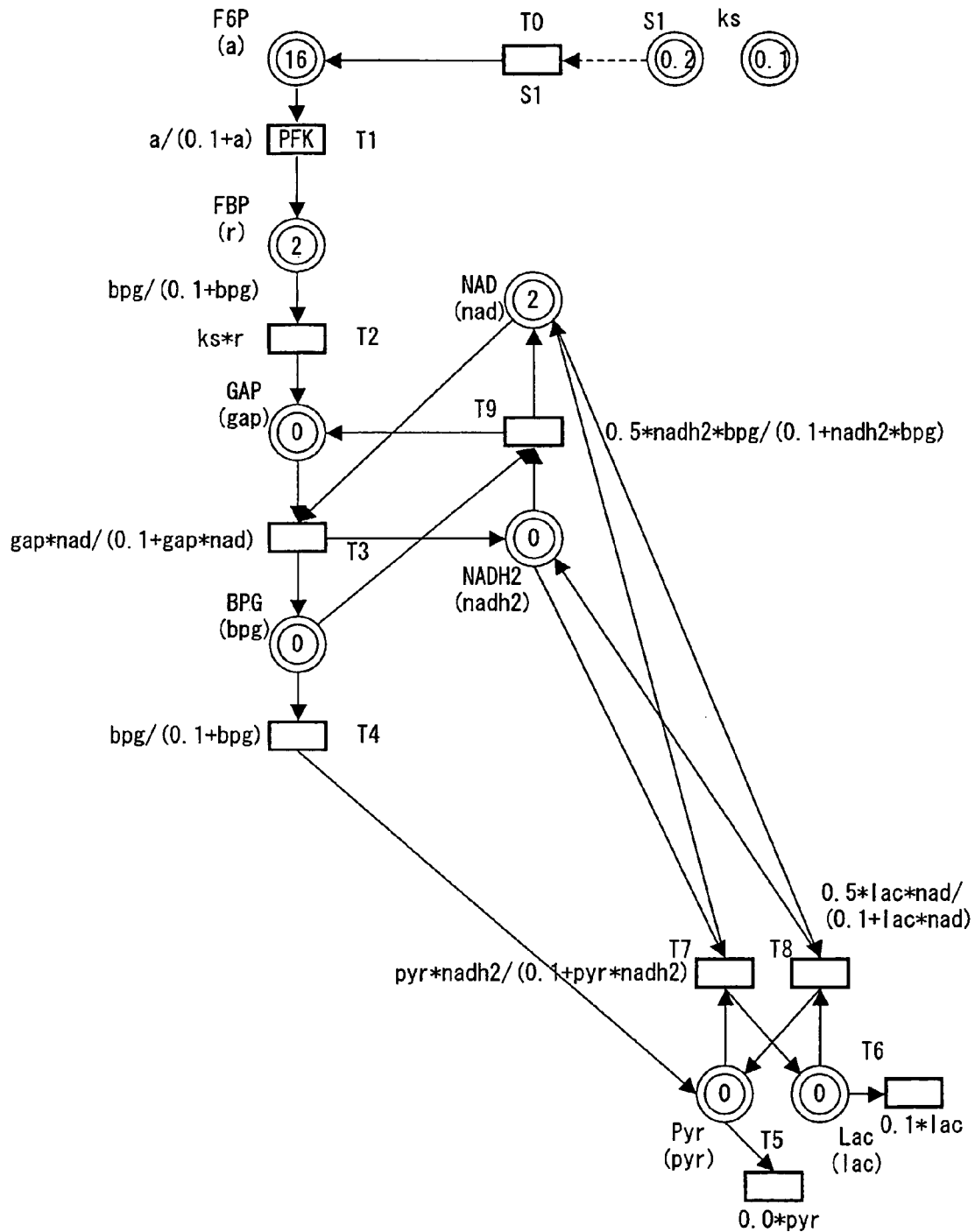
F I G. 8

Variables: {a, r, gap, bpg, pyr, lac, nadh2, nad}
Parameters: {vm1, km1, ···, vm6, km6}
Others: constant T0 = s1
T1 = vm1*a/(km1+a)
T2 = ks * r
T3 = vm2*gap*nad/(km2+gap*nad)
T4 = vm3*bpg/(km3+bpg)
T7 = vm4*pyr*nadh2/(km4+pyr*nadh2)
T5 = 0*pyr
T8 = vm5*lac*nad/(km5+lac*nad)
T6 = 1/10*lac
T9 = vm6*nadh2*bpg/(km6+nadh2*bpg)

FIG. 9

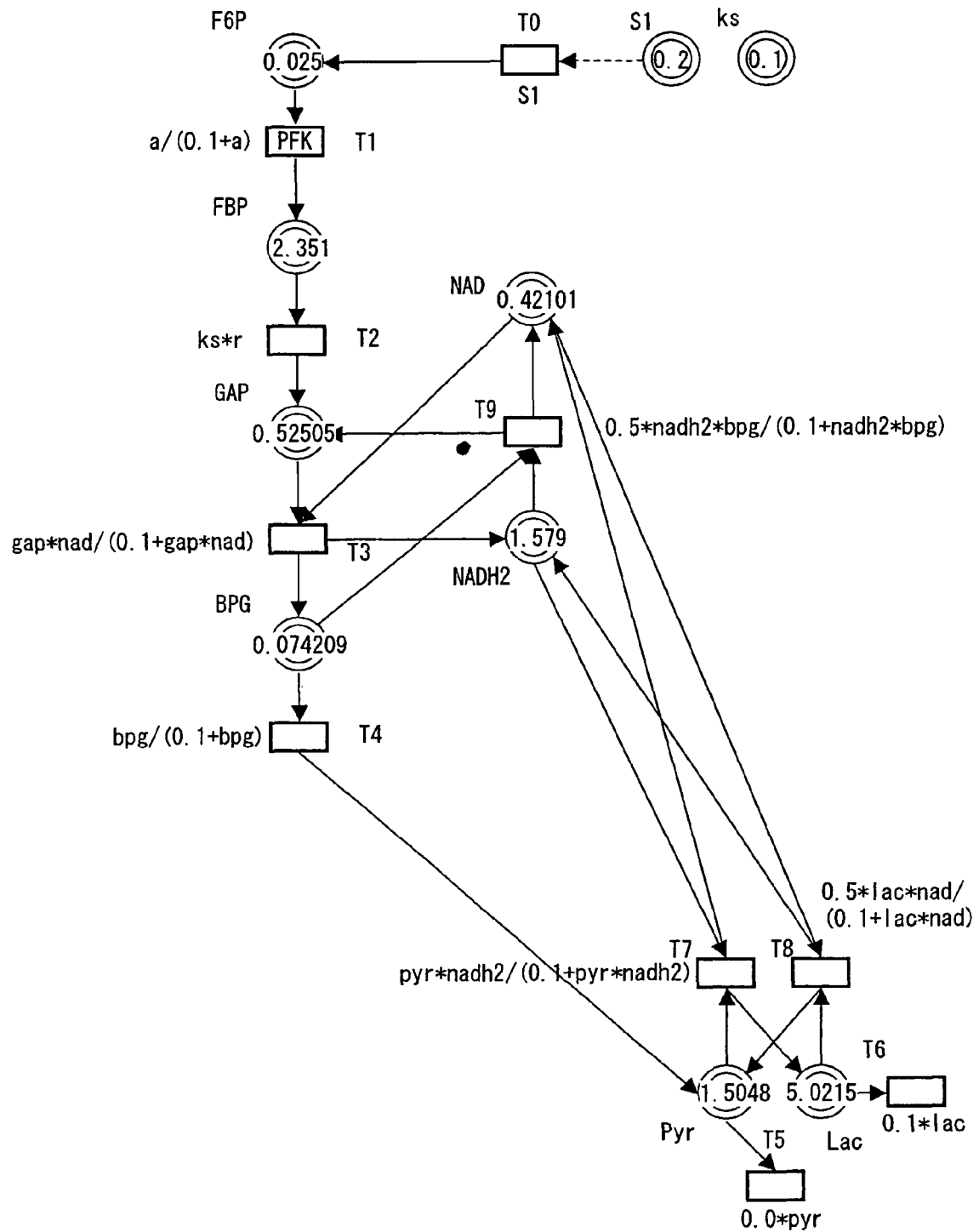
F I G. 1 1

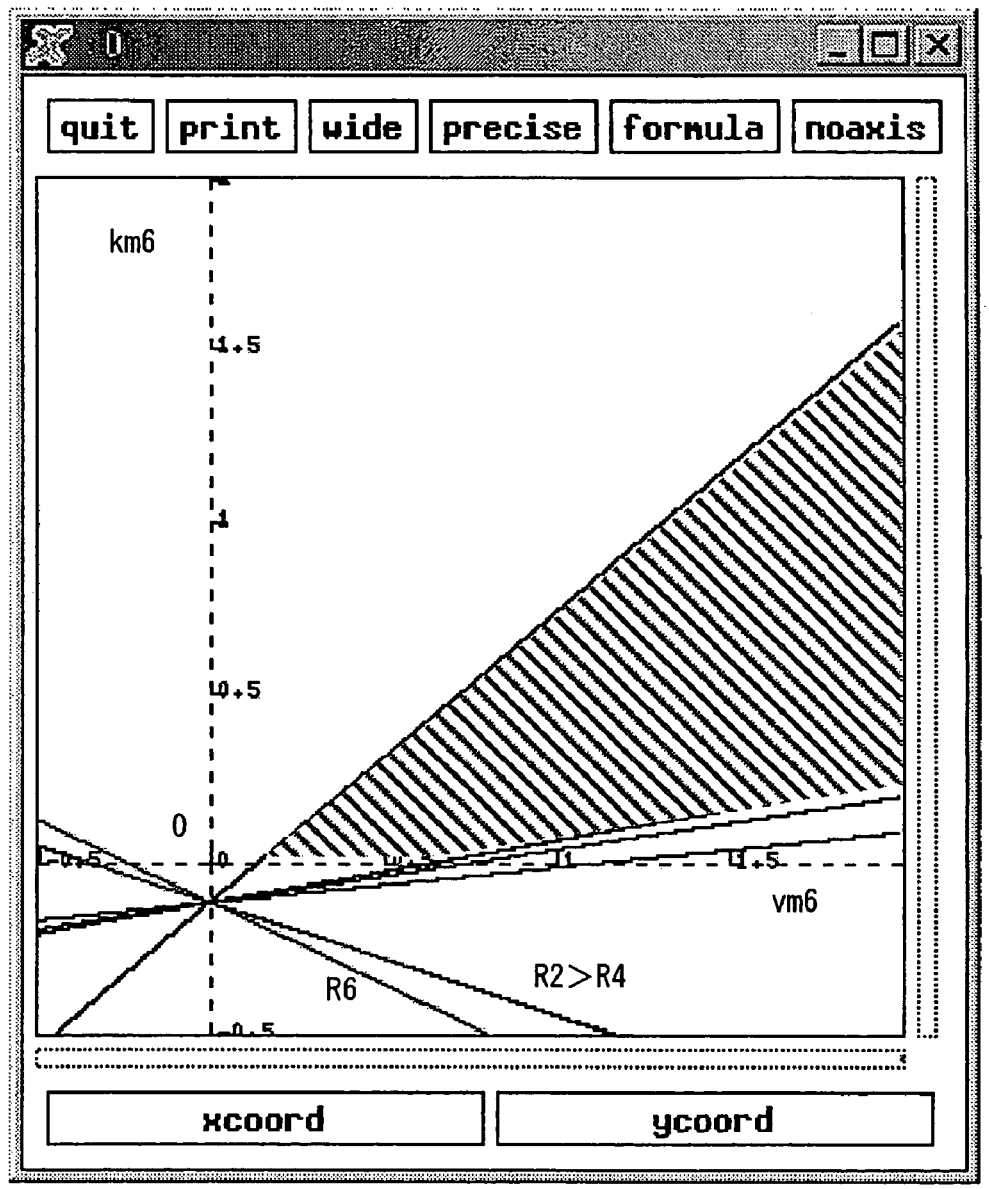
F I G. 1 5

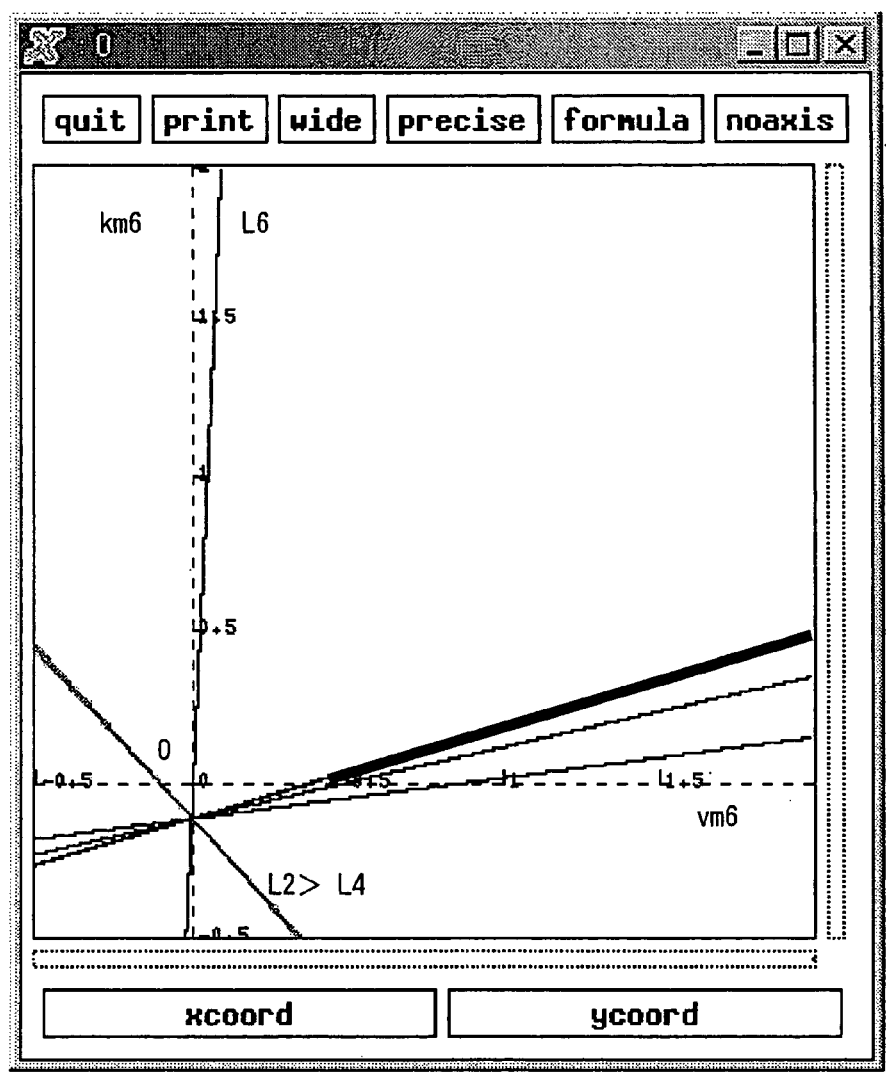
F I G. 16

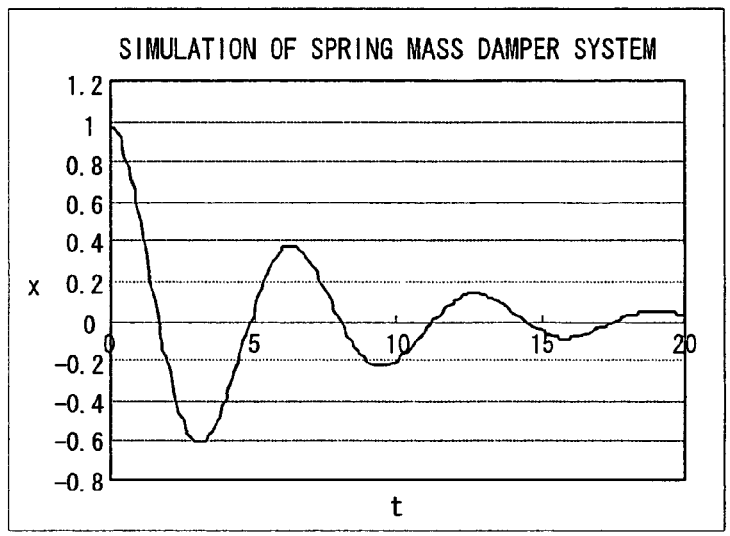
| t | x | x' |
|---|---|---|
| 0 | 1 | 0 |
| 0.1 | 0.995056 | -0.09829 |
| 0.2 | 0.980477 | -0.19259 |
| 0.3 | 0.956701 | -0.28211 |
| 0.4 | 0.924245 | -0.3661 |
| 0.5 | 0.883694 | -0.44392 |
| . | . | . |
| . | . | . |
| 4.7 | -0.10938 | 0.485547 |
| 4.8 | -0.06111 | 0.479024 |
| *4.9* | *-0.01373* | *0.46799* |
| *5* | *0.032334* | *0.452691* |
| 5.1 | 0.076667 | 0.433409 |
| 5.2 | 0.118886 | 0.410456 |
| 5.3 | 0.158641 | 0.38417 |
| 5.4 | 0.195615 | 0.354911 |
| 5.5 | 0.22953 | 0.323059 |
| 5.6 | 0.260148 | 0.289007 |
| 5.7 | 0.287267 | 0.253157 |
| . | . | . |
| . | . | . |
F I G. 1 8

MODEL PARAMETER DETERMINING METHOD IN A SIMULATION BY APPLYING A QUANTIFIER ELIMINATION ALGORITHM

BACKGROUND OF THE INVENTION

1. Field of the Invention

The present invention relates to a model parameter determining method for various models in a engineering field, and more specifically to a model parameter determination program and a model parameter determination apparatus for obtaining a possible range, etc. of a feasible parameter by applying a quantifier elimination algorithm to a constraint expression generated based on, for example, a model of a simulation of a biological system and variable data.

2. Description of the Related Art

The present invention processes an application problem in a wide range represented by a first order predicate logic expression, that is, an expression with a quantifier, in various engineering fields. In the explanation below, the contents of the present invention are explained mainly by referring to the application in a simulation of a biological system.

It has been demanded to efficiently determine a parameter of a model in a field of analyzing and designing a biological system by performing a simulation on various systems relating to a living object and a cell, that is, a model of a biological system, for example, a model of a glycolytic reaction, etc.

Therefore a problem to be dealt with in the present invention is to grasp the property or the entity of a biological system based on the model when a time-series data for some variables of a biological system, which is obtained from a numerical simulation via a model (ex. HPN) or experimental observation, is given. Practically, for example, the feasible range of a reaction coefficient as a parameter of a model is obtained, a feasible area of common parameters is obtained when some actually measured values of a parameter of a model are obtained, the existence of a feasible value of parameters of a model is confirmed, and new findings about a biological system are detected.

With the study of biotechnology growing actively, the development of effective solution means for satisfying the above-mentioned objects is strongly demanded. The means is required in various fields in, for example, finding the biological system designing process in the industry, for example, finding the mechanism of the crisis of disease, and in the preventive medicine, tailor-made medicine, etc. However, the existing technology has no effective methods for satisfying the above-mentioned demand. Therefore, some tools have been used for performing numerical simulations by structuring a model of a simulation of a biological system, for example, a genomic object net (GON), a visual object net (VON), E-CELL, etc. to set various parameter values, repeat numerical simulations, determining the value of a parameter desired by trial-and-error, and estimating the property of the system, thereby requiring an exceedingly laborious operation.

Relating to the hybrid Petri net for use in the above-mentioned modeling operation, the genomic object net and visual object net as a tool for simulation, the following documents and thesis are presented. However, the contents of these documents are not directly related to the present invention, the detailed explanation is omitted here.

[Non-Patent Literature 1]
www genomicobject.net/member_3/index.html,
"Genomic Object Net Projects", Jul. 9, 2004

[Non-Patent Literature 2]
www.genome.ib.sci.yamaguchi-u.ac.jp/~atsushi/phase/karui00.pdf, "Induction of λ Phage and Representation of Inverse Adjustment Mechanism by Hybrid Petri Net", Jul. 9, 2004

[Non-Patent Literature 3]
www.Systemtechnik.tu-i1menau.du/~drath/visual_E.htm, "Visual Object Net ++", Jul. 9, 2004

FIG. 1 is an explanatory view of the existing system of a simulation of a biological system. In FIG. 1, for example, a model is generated using the hybrid Petri net, etc. on a glycolytic system, a numerical simulation is repeatedly performed on the values of various parameters using a simulation tool on the model, thereby designing a biological system in the trial-and-error system and understanding the entity of a biological system.

However, in the above-mentioned method, there have been the problems that choice of parameter values to be examined simply depends on the knowledge and experience of a designer, an intermediate solution is adopted, a simulation is meaninglessly repeated for seeking a solution which does not practically exist. Additionally, it is very difficult to determine a parameter which simultaneously satisfies a plurality of requests. As a result, it has been very difficult to understand the entity of a biological system, and extract new findings. Practically, it is assumed that although a model that indicates a health status and an ill status using the same parameter, but such a model has never been successfully realized.

The present invention processes a biological system as a constraint solving problem described in a first order predicate logic expression as described later, and obtains the presence/absence of a solution by a quantifier elimination method, a possible range of a feasible parameter, etc. The existing technology in which the quantifier elimination method is applied to a technology field such as the control technology, etc. is disclosed by the following literature.

[Patent Literature 1] Japanese Patent Application Laid-open No. Hei 11-328239 "Control System Analysis, Design Device, and Control System Analysis, and Design Processing Method"

In this literature, a problem given as a semidefinite programming (SDP) problem, or an extended semidefinite programming (ESDP) problem is formulated, the problem is converted into a first order predicate logic expression, and a solution is analytically obtained. However, in the simulation of a biological system aimed at by the present invention, it is important to obtain a feasible range of a parameter rather than to analytically obtain a solution. Therefore, it is difficult to apply this literature as is.

SUMMARY OF THE INVENTION

The present invention has been developed to solve the above-mentioned problems, and aims at providing a model parameter determination program and a model parameter determination apparatus in performing a simulation to efficiently obtain a parameter of a model, for example, a feasible range of a reaction coefficient corresponding to a model of a target biological system and a control system, a numerical simulation, the value of variable data in a system obtained by an actual measurement, and acquired new findings using the obtained results.

A program stored in a storage medium according to the present invention is a program used by a computer for performing a simulation of a biological system, a control system, etc. The program is used to direct a computer to perform: a step of receiving input of variable data based on a result of a simulation or an experiment performed based on a model of a system to be analyzed; a step of generating a constraint expression relating to a parameter of a model based on the received data and the model of the system; and a step of obtaining the presence/absence of a solution and/or a possible range of a feasible parameter by applying a quantifier elimination algorithm to the constraint expression. In the present invention, in addition to a parameter of a model of a constraint expression, a constraint expression includes an error variable corresponding to a variable of a model, and also uses variable data at least two time points.

BRIEF DESCRIPTION OF THE DRAWINGS

FIG. 3 is an explanatory view of the outline of a quantifier elimination (QE) method;

FIG. 4A is an explanatory view of applying a QE method to a constraint solving problem;

FIG. 4B shows an example of applying a QE method to a constraint solving problem;

FIG. 8 shows a model corresponding to a glycolytic system;

FIG. 9 shows the variable, the parameter, and the reaction speed shown in FIG. 8;

FIG. 11 shows a model of a glycolytic system at a time t;

FIG. 15 shows a feasible area of a parameter according to the fourth embodiment;

FIG. 16 shows a feasible area of a parameter according to the fifth embodiment;

FIG. 18 shows a result of the experiment and the simulation for the system shown in FIG. 17;

DETAILED EXPLANATION OF THE PREFERRED EMBODIMENTS

Figure 1:
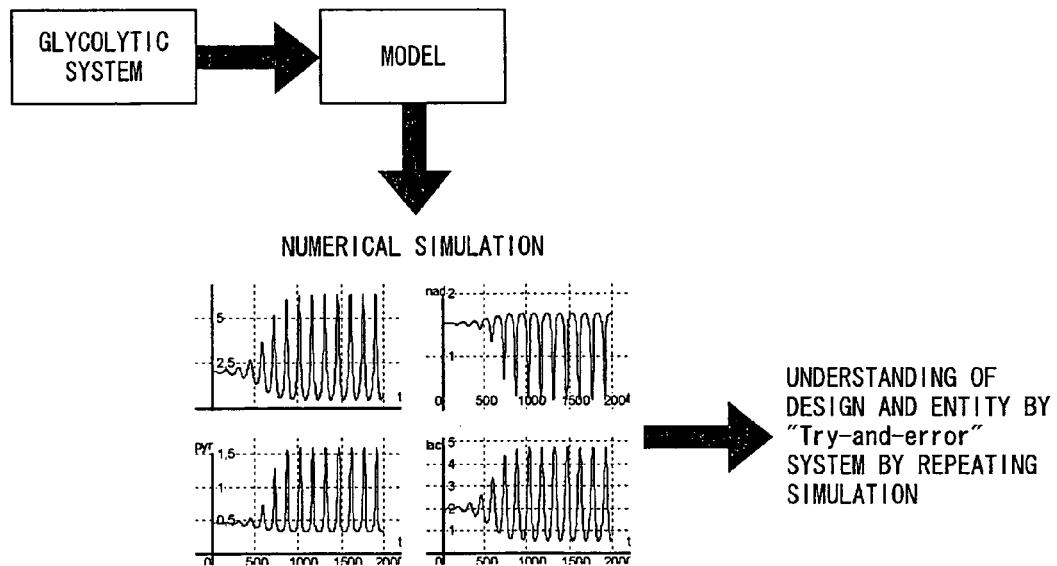
FIG. 1 is an explanatory view of the system of a simulation of a biological system computer the existing technology.
Figure 2:
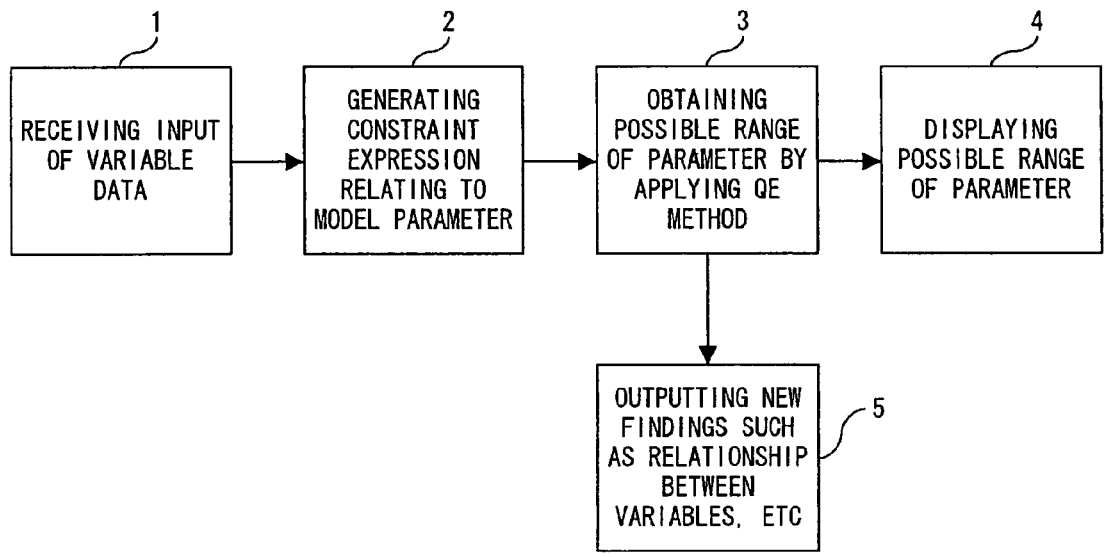
FIG. 2 is a block diagram of the functions showing the principle of the model parameter determination program stored in a storage medium according to the present invention.

FIG. 2 is a block diagram of the functions showing the principle of the model parameter determination program stored in a storage medium according to the present invention. The program is used by a computer for performing a simulation of a biological system, a control system, etc. In step 1 shown in FIG. 2, input of variable data in a model of a system is received. In step 2, based on the received data and the model of the system, a constraint expression relating to the parameter of the model is generated. In step 3, a quantifier elimination (QE) algorithm is applied to the constraint expression to know the presence/absence of a solution and obtain the possible range of feasible parameter.

The possible range of a feasible parameter can be displayed on the display in step 4 shown in FIG. 2, and a sample solution based on the application result of the quantifier elimination algorithm, a condition expression among variables of a model, or a relational expression between parameters can be output as new findings about a system in step 5.

Furthermore, as the variable data, the variable data at two different times can be used. The constraint expression can include in addition to the parameter of the model, an error variable corresponding to the variable of a simulation model of, for example, a biological system, or an error variable corresponding to an equation in a constraint expression.

Then, the model parameter determining method on the contents of the program for which the function block diagram is shown in FIG. 2 can be used.

Furthermore, the model parameter determination apparatus according to the present invention includes: a data input unit for receiving input of variable data in a model of a biological system, etc.; a constraint expression generation unit for generating a constraint expression relating to a parameter of a model based on the received data and the model of the system; and a parameter determination unit for obtaining the presence/absence of a solution and/or a possible range of a feasible parameter by applying a quantifier elimination algorithm to the constraint expression. The apparatus can further include a display unit for displaying a possible range of the obtained feasible parameter.

That is, in the present invention, first using variable data of a given model and a system, a system of an equation or an inequality is generated as a constraint expression to be satisfied by the parameter of a model. The constraint problem about the parameter of the model is, in general, a nonlinear and non-convex constraint problem, and it is very difficult to solve the constraint problem using a numerical method. Thus, a nonlinear and non-convex constraint problem can be processed by applying a quantifier elimination (QE) algorithm as a method for solving the constraint problem. Furthermore, since a parameter can be processed as is, the feasible area of a parameter of a model can be obtained in a form of a logical sum and a logical product of an equality and an inequality. If there is no solution, it can be correctly determined.

According to the present invention, the feasible areas of all parameters of a model can be obtained, and the presence/absence of a solution can be confirmed. When there are a plurality of requests for a system, for example, when there are requests for the range of concentration of a biological system, the influx of glucose, the efflux of lactate and pyruvate in a glycolytic model described later, a parameter which can simultaneously satisfy the plurality of requests can be obtained by overlapping the feasible areas of the parameters for the respectively requests. Furthermore, since a feasible parameter can be obtained as an area, the entity of a system can be understood further in detail, thereby detecting new findings about the system.

The present invention can also be used as a method and apparatus for designing a parameter of a system, and the designing procedure can be more systematic than a simple numerical simulation. As a result, a better solution can be selected, a correct solution can be obtained, a plurality of specifications can be more easily designed, and a robust method and an apparatus for designing a system can be provided.

The present invention obtains a feasible range of a parameter of a target system and determines the presence/absence of a solution by configuring a constraint condition expression for a parameter of a model of a system and applying a quantifier elimination (QE) method when a simulation is performed on a system. The quantifier elimination method is first described below the outline of the method is explained below.

A number of industrial and mathematical problems are described by expressions using an equation, an inequality, a quantifier, a Boolean operator, etc. The expressions are called first order predicate logic expressions, and a quantifier elimination (QE) algorithm is used in configuring an equivalent expression without a quantifier for a given first order predicate logic expression.

There is a following document for introduction of the outline of the quantifier elimination method.

[Non-patent Literature 4] Canviness, B. and Johnson, J. "Quantifier Elimination and Cylindrical Algebraic Decomposition", Texts and Monographs in Symbolic Computation, (1998).

FIG. 3 is an explanatory view of the outline of the QE method. In FIG. 3, a first order predicate logic expression is input using a polynomial, an inequality, etc., and a feasible area of a parameter without a quantifier is output. When all variables are quantified, true or false, that is, the presence/absence of a solution, is output. When it is present, a sample solution can also be output. This problem is called a decision problem.

For an existential problem with the constraint of $x^2+bx+c=0$ for variable x, the expression $b^2-4c \geqq 0$ is obtained as an equivalent expression without a quantifier.

When there is no quantifier for some variables, an expression without a quantifier equivalent to a first order predicate logic expression given by the QE algorithm is obtained. The obtained expression describes the possible range of remaining variables without quantifiers. If there is no such range, false is output. The problem is called a general quantifier elimination problem.

The method for solving a constraint solving problem using a QE algorithm and a simple and practical example are described below by referring to FIGS. 4A and 4B. FIG. 4A is an explanatory view showing a common method of solving a constraint solving problem. In FIG. 4A, an inequality and an equality relating to fi ($x_1, \ldots, x_n$) can be given as a constraint condition expression. The problem for finding a variable $x_1, \ldots, x_n$ satisfying the condition expression is solved using a QE algorithm, the fesibillty, that is, true or false, is output. A feasible range is also obtained, and arbitrary Boolean coupling can be used as a merit.

FIG. 4B shows a practical example. In example 1, a quantifier is provided for both x and y. Therefore, through the QE algorithm, "true" and a sample solution are output. In example 2, a quantifier is provided only for x. Therefore, the feasible range of y as another variable is output.

The quantifier elimination method, that is, the QE algorithm, can be applied to the method for solving not only a constraint solving problem, but also an optimization problem, that is, a constraint solving problem with an object function for optimization of an object function under a constraint condition. However, since the present embodiment applies a QE algorithm to a simple constraint problem as described later, the explanation relating to the optimization problem is omitted here.

Figure 5:
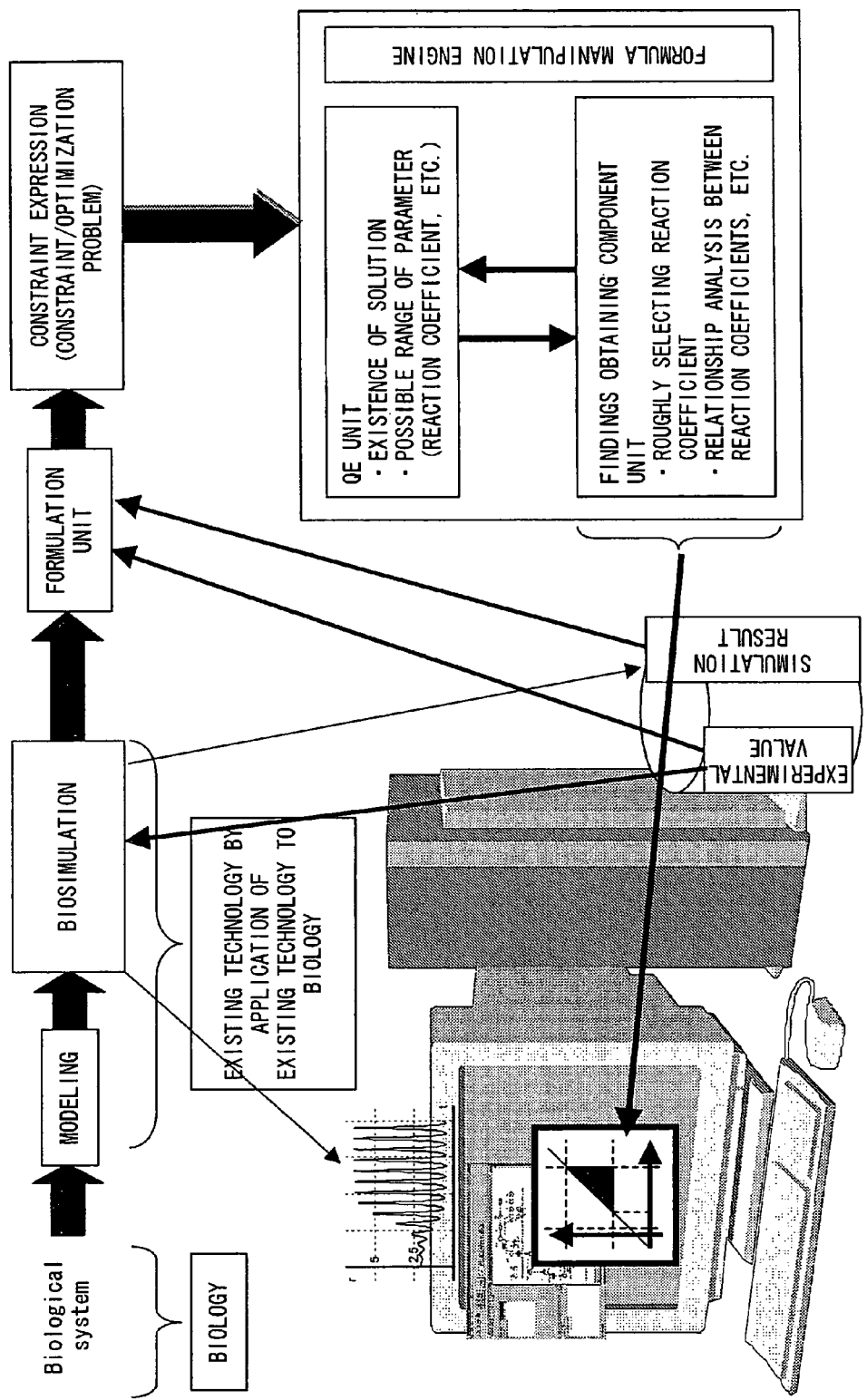
FIG. 5 is an explanatory view of the entire system of a simulation of a biological system according to the present invention.

Described below is the simulation of a biological system as the first example of the present invention. FIG. 5 is an explanatory view of the entire system of the simulation of a biological system according to the present invention. In the present system, a biological system is modeled using the knowledge of biology. In the modeling process, for example, a hybrid Petri net, etc. is used as described above for performing the modeling process appropriate for simulation. In this biosimulation, for example, an experimental value stored in a file is used as necessary, and the result of the simulation is stored in a file.

The process after the biosimulation is the process specific to the present invention. First, using a simulation result, an experimental value, etc., for example, using a reaction coefficient, etc. as a parameter for which a feasible range is to be determined, a constraint expression in a constraint solving problem or an optimization problem is generated by a formulation unit. The generated constraint expression is provided for a formula manipulation engine.

As a process performed by the formula manipulation engine, first the QE unit for performing the quantifier elimination method obtains the information about the presence/absence of a solution, the feasible range of a parameter of a reaction coefficient, etc. corresponding to the result, a findings obtaining component unit roughly obtains a reaction coefficient, analyzes the relationship between the reaction coefficients, etc. The findings about the parameter of a biological system and its operation are obtained, and the result is displayed on the display as, for example, a feasible range of a parameter. The result is used again in biosimulation for contribution to the enhancement of the precision in simulation.

Figure 6:
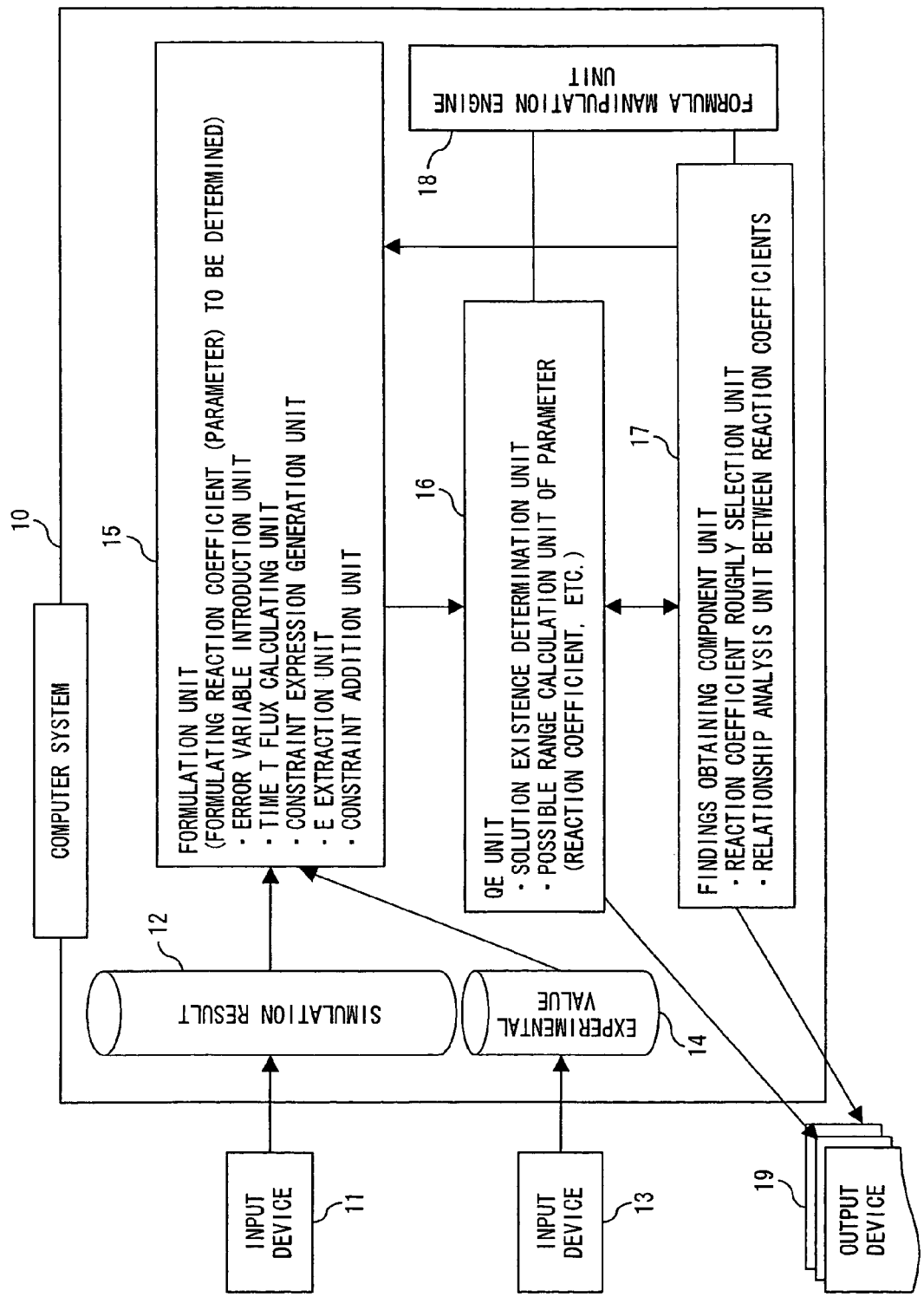
FIG. 6 is a block diagram of the configuration of the functions of the model parameter determination apparatus for performing a process specific to the present invention in FIG. 5.

FIG. 6 is a block diagram of the configuration of the model parameter determination apparatus for performing the process corresponding to the formulation unit and the formula manipulation engine shown in FIG. 5. In FIG. 6, a simulation result is input to a computer system 10 through an input device 11, and an experimental value is input to the computer system 10 through an input device 13. They are respectively stored in files 12 and 14.

The data in these files are input to a formulation unit 15 for formulating a reaction coefficient as a parameter for which a feasible range is to be determined. The formulation unit 15 comprises: an error variable introduction unit for implementing an error variable for processing an error in an experimental value as a variable as described later; a time t flux calculating unit for obtaining the speed of the reaction of an enzyme for the substrate at a time t; a constraint expression generation unit for generating a constraint expression as a constraint solving problem or an optimization problem; an E extraction unit for extracting an expression including a concentration variable and an error variable to be determined as E to add a constraint to a variable, that is, the concentration variable and the error variable of the substrate; and a constraint addition unit for the E.

The process performed by a QE unit 16 and a findings obtaining component unit 17 is performed using a formula manipulation engine unit 18. The QE unit 16 comprises a solution existence determination unit for determining the presence/absence of a solution, and a possible range calculation unit for a parameter such as a reaction coefficient, etc. The findings obtaining component unit 17 comprises a reaction coefficient selection unit and a relation analysis unit for reaction coefficients. The respective process results are output by an output device 19, for example, a printer and a display.

Figure 7:
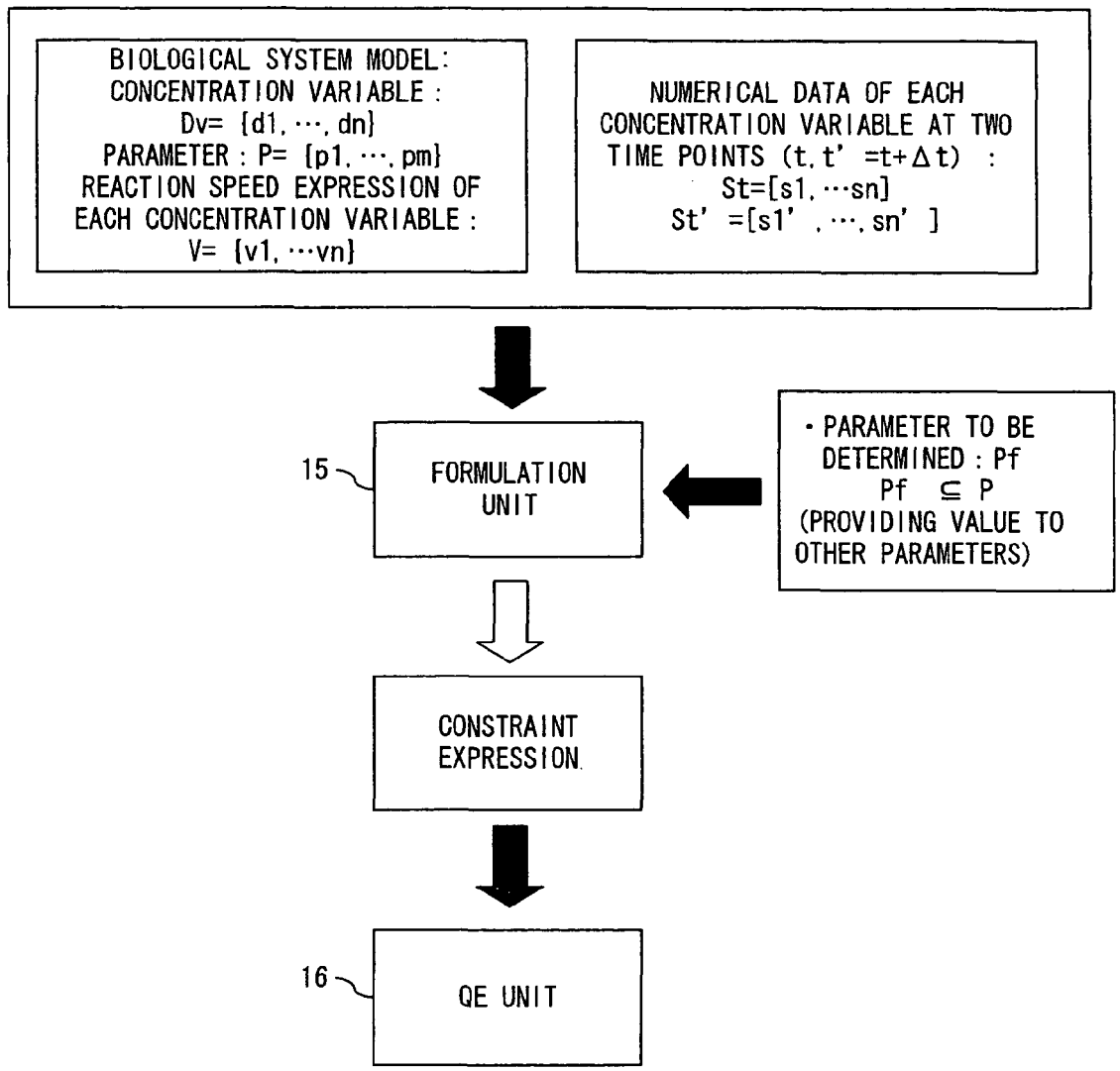
FIG. 7 is an explanatory view of a method of generating a constraint expression in the formulation unit shown in FIG. 6.

FIG. 7 is an explanatory view of a constraint expression generating method by the formulation unit 15. First, a biological system model and numerical data of the concentration variable of each substrate at least at two time t and t'=t+Δt are provided for the formulation unit 15. As a biological system model, as described later, the concentration variables from d1 to dn of each substrate in a model and the parameters p1 through pn of the model, and the expressions v1 through vn for providing a reaction speed of each concentration variable are provided. As the numerical data of concentration variables, the concentration s1 through sn of each substrate at time t, and numerical data s1' through sn' at time t' are provided.

For the formulation unit 15, one or more parameters Pf for which a feasible range is to be determined in the set P of parameters are specified in a set P of parameters, and other parameters are provided as actual values as described later, and the formulation unit 15 generates a constraint expression using the above-mentioned input data, and outputs the result to the QE unit 16.

Described below is a practical example of applying a QE algorithm to a biological system problem according to the present embodiment. FIG. 8 shows a part of a glycolytic model as a basic metabolic pathway of glycolysis existing in most living objects. FIG. 9 shows a variable, a parameter, and a reaction speed expression in a model shown in FIG. 8. The glycolytic system is normally a path for generation of energy from D-glucose, that is, dextrose, and the chemical details are shown in FIG. 10.

Figure 10:
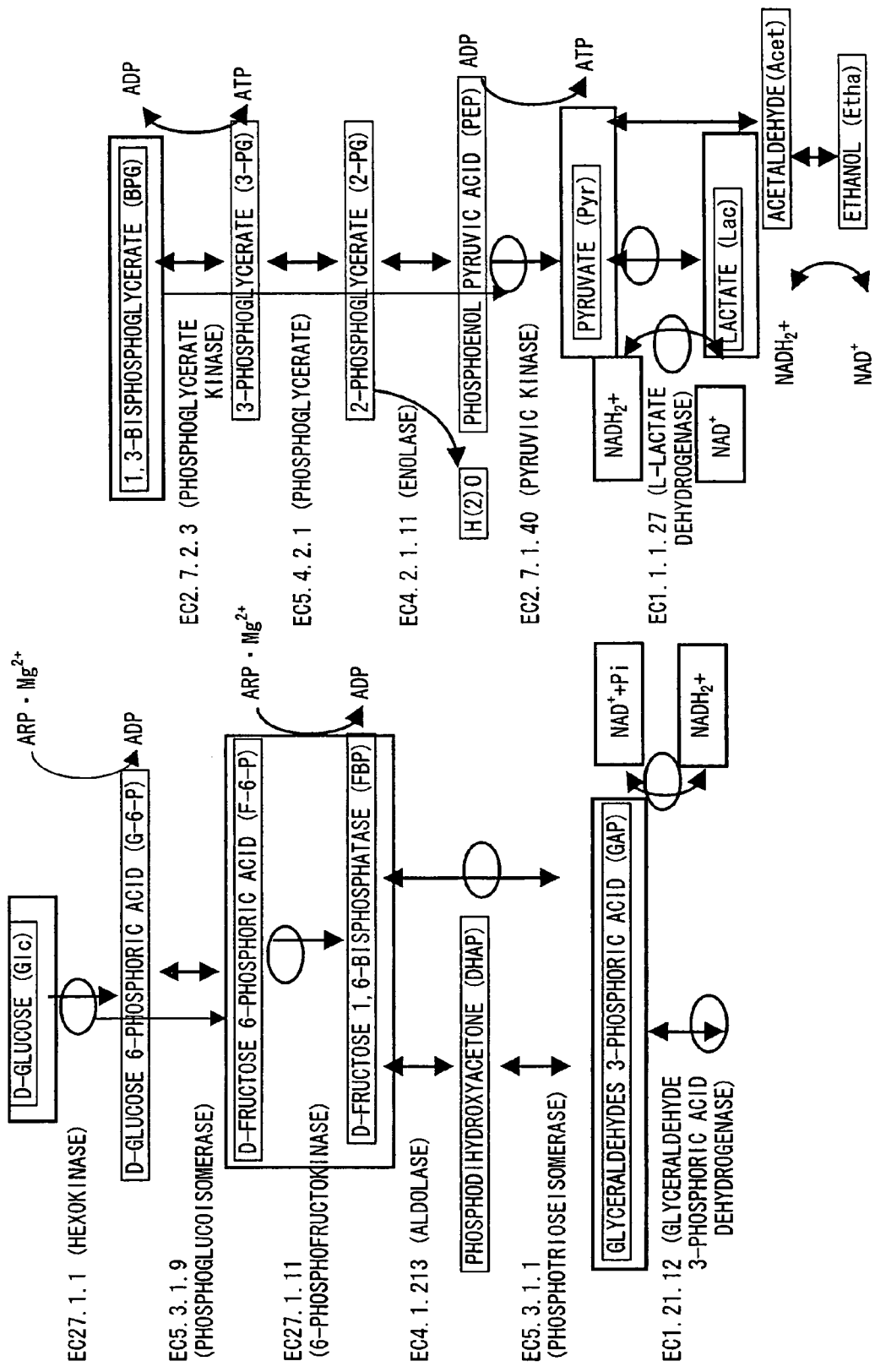
FIG. 10 shows the anaerobic glycolytic system corresponding to FIG. 8.

In FIG. 8, the outline of the model corresponding to the glycolytic system shown in FIG. 10 is shown. The double circles at the left top in FIG. 8 correspond to the D-fructose 6-phosphoric acid shown in FIG. 10, and the reaction proceeds in the order of D-fructose 1,6-bisphosphatase (FBP) to glyceraldehyde 3-phosphoric acid, 1,3-bisphosphoglycerate (BPG). Thus, the path to the generation of pyruvate (Pyr) and lactate (Lac) and the feedback path to mid course are shown.

In FIG. 8, the double circles indicate a substance explained by referring to FIG. 10, that is, the substrate to be processed with an enzyme, and the number in the double circles indicates the concentration of the substrate. The unit of the concentration is, for example, mol/l. In this example, a given value is 1 as a normalized value.

For example, the concentration of F6P at the left top shown in FIG. 8, that is, D-fructose 6-phosphoric acid, is 16. On the other hand, FBP, that is, D-fructose 1,6-bisphosphatase, is obtained by operating PFK pointed to by the arrow, that is, the enzyme called 6-phosphofructokinase. The reaction speed is expressed by $a/(0.1+a)$ using the concentration (variable) of F6P as a. When the concentration of FBP is $r=2$, and a certain enzyme having the reaction speed of $T2=ks*r$ operates, glyceraldehyde 3-phosphoric acid (GAP) can be obtained.

The double circles at the right top shown in FIG. 8 indicates glucose, and a part of the glucose is used in the glycolytic system as necessary. In this example, glucose having the concentration of 0.2 is used as basic input to the glycolytic system, and F6P is obtained by the effect of the enzyme having the reaction speed $T0=s1$ to the glucose. The double circles to the right of the glucose provides the value of ks in the expression of the above-mentioned reaction speed T2. FIG. 8 shows the model at the calculation starting time t=0, and the concentration of most substrates in the model is still 0.

In FIG. 8, the variable inside the parentheses indicates the concentration of each substrate. That is, a for F6P, r for FBP, gap for GAP, bpg for BPG, pyr for Pyr, lac for Lac, nadh2 for NADH2, and nad for NAD are used as variables. These variables indicate the concentration here, but normally correspond to the status variables corresponding to first order ordinary differential equations in, for example, a control system.

T0 through T9 indicating the reaction speeds between substrates are shown in FIG. 9. The vm1 through vm6, and the km1 through km6 used in the expressions are parameters used for the simulation. In these parameters, vm indicates the maximum speed corresponding to the reaction, and km indicates a Michaelis constant in a Michaelis-Menthene expression as an expression of a speed. In the expressions of these reaction speeds, T0=s1 indicates 0.2, and indicates the inflow speed of glucose. T6 indicates the issue speed of lactate as a fatigue-producing substance. Other expressions are Michaelis-Menthene expressions indicating the reaction speeds. There are two types of expressions, that is, an expression determined by the concentration X of one substrate, and an expression determined by the concentration X and the concentration Y of two substrates.

In FIG. 9, a total of 12 parameters, that is, the values of the parameters from vm1 through vm6, and from km1 to km6 are all entered in FIG. 8. For example, the value of vm1 in the expression T1 is 1, and the value of km1 is 0.1, which can be read from the expression T1 written by the rectangle PFK. In the QE algorithm, to obtain the feasible range of at least a part of these 12 parameters, a constraint expression is generated for at least a part of variables and the quantifier elimination method is used.

Figure 12:
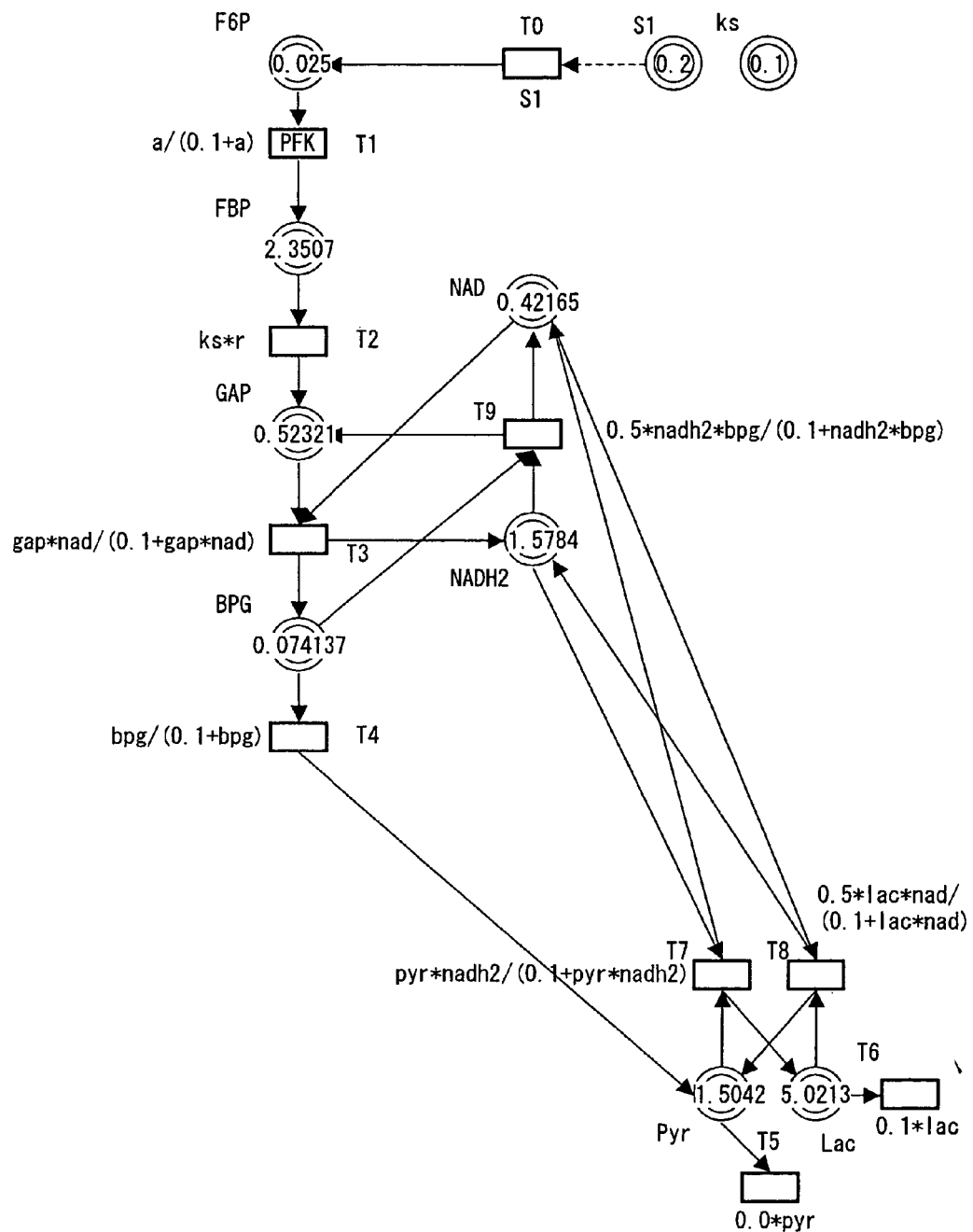
FIG. 12 shows a model of a glycolytic system at a time t'.

FIGS. 11 and 12 show a model after the time t=50 sec. for the glycolytic system indicating the time t of 0 in FIG. 8, and a model after 50.01 sec. Naturally, the concentration of each substrate depends on each case shown in FIGS. 8, 11, and 12.

In the present embodiment, as shown in FIGS. 11 and 12, a constraint expression is generated using the concentration of each substrate, that is, a value of variable, at two time points. That is, from a value of each concentration variable in t=50 (FIG. 11), an expression for calculation of a value of a concentration variable after 0.01 sec. is generated for each variable, and a constraint expression is generated by assuming that the generated expression matches the value of the concentration at t=50.01 (FIG. 12). Thus, by using the values of a variable at two time points, the calculation of a QE algorithm substantially matches the level of the quadratic calculation, thereby considerably reducing the amount of calculation.

Although the feasible range of a parameter can be obtained by generating a constraint expression using the expression of the concentration at one time point and the condition that the reaction speed is positive, a constraint expression is generated using a value of a variable at two time points according to the present embodiment.

A fixed value indicated in the expression of the reaction speed shown in FIG. 9 is used for 10 parameters from vm1 to vm5 and km1 to km5 in the 12 parameters explained by referring to FIG. 9, and the feasible range of the remaining two parameters vm6 and km6 is obtained. In the constraint expression obtained from the above-mentioned two time points, the expression including two parameters vm6 and km6 is retrieved, the QE algorithm is applied, and the feasible range of the two parameters vm6 and km6 is obtained.

However, when data obtained from the numerical simulation and the experiment is used as a value of a variable, the error in number crunching and an observation error are included. Therefore, although there is a solution, a result of "no solution" can be obtained in the QE algorithm in which a correct calculation is performed based on the formula manipulation. In the present embodiment, it is assumed that observation data includes small errors, a constraint expression is generated using an error variable, and the QE is applied. Actually, using eight values of ea, er, egap, ebpg, epyr, slac, enadh2, and enad each having an "e" as the header of each variable as error variables for the respective concentration variables, a constraint expression is generated with an error variable added to the observation data of each variable. For example, for the variable gap, a result of adding egap to 0.52505 which is the value of the concentration in FIG. 11 is used. By adding the expression including the two parameters vm6 and km6 for which a feasible range is to be obtained, the expression of assigning a practical range to each error variable, for example, the expression of the value of egap between −0.01 and 0.01, to the above-mentioned constraint expressions, the complete constraint expression is structured.

Figure 13:
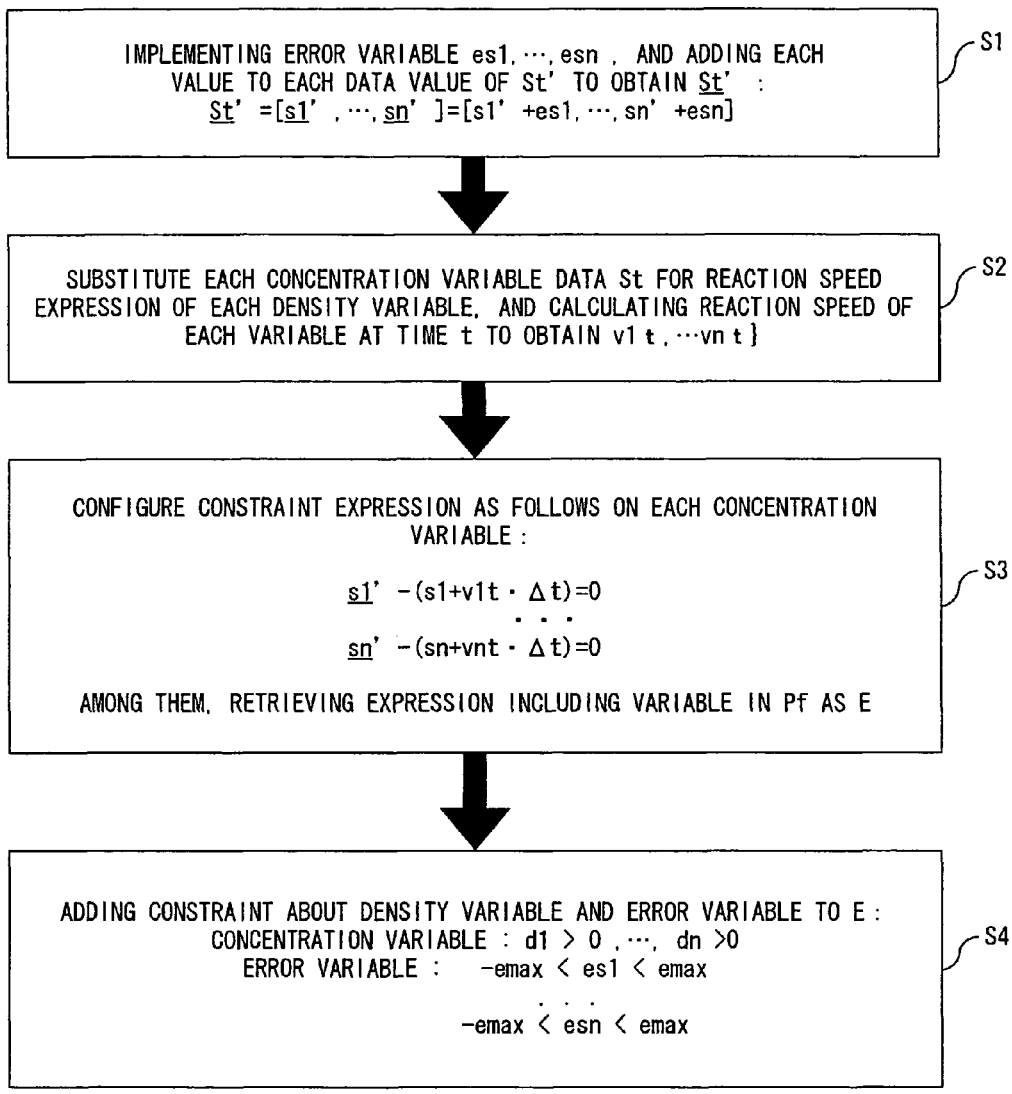
FIG. 13 is a flowchart of the process of formulating a constraint expression.

FIG. 13 is a flowchart of the constraint expression formulating process for performing the above-mentioned process. In FIG. 13, first in step S1, each variable is implemented. In this example, esn is implemented from the error variable es1 for the concentration variable, an error variable is added to the value of the data at time t' explained by referring to FIG. 7. In step S2, the data of each concentration variable at time t, that is, st, is substituted for the reaction speed expression of each concentration variable, the reaction speed of each variable at time t is calculated, and the speeds v1$t$ through vn$t$ are obtained.

Then, in step S3, a constraint expression for a concentration variable is generated. That is, a constraint expression indicating the difference of 0 between the sum of the numerical data of the concentration variable at time t' and, for example, an error variable, and the sum of the numerical data at time t and a concentration difference corresponding to the progress amount of the reaction between the difference Δt between two time points is generated for each concentration variable. Among them, the result of retrieving only the expression including the parameter in one or more parameter Pf for which the feasible range explained by referring to FIG. 7 is to be determined is defined as E. In step S4, the concentration variable and a constraint about the error variable are added to the constraint expression and output to the QE unit 16. The constraint relating to the concentration variable can be that the value of each concentration variable is positive as a reasonable physical constrains, and emax for determination of the range of a variable as an absolute value for an error variable corresponding to each concentration variable is specified. As emax, a practical value can be assigned as described later, and also can be a variable.

Using the flowchart shown in FIG. 13, as described above, a constraint expression including each error variable for obtaining the feasible range of two parameters vm6 and km6 is obtained. The constraint expression φ is displayed below. The two parameters vm6 amd km6 have physically positive values.

$$\phi(vm6, km6, egap, ebpg, enadh2, enad) =$$

$$7523902143790461 1000 0* vm6 +$$

$$(6421026010000000000000000* egap - 4092911580889000000000) *$$

$$km6 + 7523902143790461 1000000* egap -$$

$$4795910524242768 53779 = 0 \text{ and}$$

$$- 23405919081564150 67446250* vm6 +$$

$$(1997500928885875000000000000* ebpg +$$

$$5100547808120217000000000) * km6 +$$

$$23405919081564150 6744625000* ebpg +$$

$$597661846070320436514387 = 0 \text{ and}$$

$$- 18142251291611838789 96213129675* vm6 +$$

$$(15482905704659837575425000000000000* enadh2 +$$

$$22655703539927129081 87000000000) * km6 +$$

$$18142251291611838789 9621312967500* enadh2 +$$

$$2654704967207240216 49561902057 = 0 \text{ and}$$

$$18142251291611838789 96213129675 0* vm6 +$$

$$(15482905704659837575425000000000000* enad -$$

$$22036387311740735578 53000000000) * km6 +$$

$$18142251291611838789 9621312967500 0* enad -$$

$$2582135962040792861 335770495383 = 0 \text{ and}$$

$$vm6 > 0 \text{ and } km6 > 0 \text{ and}$$

$$- 1/100 < egap < 1/100 \text{ and}$$

$$- 1/100 < ebpg < 1/100 \text{ and}$$

$$- 1/100 < enadh2 < 1/100 \text{ and}$$

$$- 1/100 < enad < 1/100$$

The QE is applied to the constraint problem. Thus, the possible area of a solution and the presence/absence of a solution can be determined with the observation error taken into account.

Practically, the following QE problem is considered as the first embodiment.

$$\phi 1 = \exists vm6 \exists km6 \exists egap \exists ebpg \exists enadh2 \exists enad(\phi)$$

Since all variables are provided with quantifiers, the QE algorithm determines whether or not a given first order predicate logic expression φ1 is true (having a solution of a real number) or false. In this case, the answer is true. When it is true, the QE also provides a sample solution, but, in this case, a condition expression between variables is obtained, but not a practical value of a variable. The solution is described below. In this example, epsilon 1 indicates a positive infinitesimal. The infinity 1 indicates a large value exceeding a predetermined value.

[true;

km6=infinity1, $$vm6 = \frac{100000000000 * epsilon1 * infinity1 + 11717601100 * epsilon1}{117176011}$$

$$ebpg = \frac{1997500928885875000 * epsilon1 - 5100547808120217}{1997500928885857000}$$

$$egap = \frac{-6421026010000000 * epsilon1 + 4092911580889}{6421026010000}$$

$$enad = \frac{-15482905704659837575425000 * epsilon1 + 22036387311740735578853}{15482905704658937575425000}$$

$$enadh2 = \frac{15482905704659837575425000 * epsilon1 - 22655703599271290818 7}{15482905704658937575542500}$$

That is, it is clear that there is a solution for the first embodiment. If a positive infinitesimal epsilon 1 is determined, then other error variables are also determined, and the relationship between the two parameters vm6 and km6 is determined. For the epsilon 1 and the infinity 1 as a large value exceeding a predetermined value, a practical range can be determined. By displaying the relationship, new findings in the simulation of a biological system can be detected.

The QE problem obtained by the following φ2 is considered as the second embodiment.

φ2=∃egap∃ebpg∃enadh2∃enad(φ)

In the second embodiment, there are no quantifiers for the two parameters vm6 and km6 as compared with the first embodiment. Therefore, an expression without a quantifier for vm6 and km6 is obtained as an equivalent expression with the first order predicate logic expression φ2 by the QE algorithm. The expression defines the feasible range of vm6 and km6. The result obtained by the QE algorithm is shown below.

17686544435833911133310300000000000000000∗km6^2 −

18142251291611838789962131296750000000000∗km6∗vm6 +

41448774507305263302595803584266000000000∗km6 −

21258366369106730297828293864114222264250∗vm6 +

24284010288022605565514311046718961214463> 0 and

13279266973485764017539700000000000000000∗km6^2 +

18142251291611838789962131296750000000000∗km6∗vm6 +

31120230659142091857252721602734000000000∗km6 +

21258366369106730297828293864114222264250∗vm6 +

18232722450190855030142276681509484407037> 0 and

17748476058652550483612000000000000000000∗km6^2 −

18142251291611838789962131296750000000000∗km6∗vm6 +

41593912517638158012915500634640000000000∗km6 −

21258366369106730297828293864114222264250∗vm6 +

24369043753499032486705624222175418105$2$> 0 and

13217335350667124667238000000000000000000∗km6^2 +

18142251291611838789962131296750000000000∗km6∗vm6 +

30975092648809197146933024552360000000000∗km6 +

21258366369106730297828293864114222264250∗vm6 +

18147688984714428108950963506053027179$8$> 0 and

25075557096978967000000000000000000000∗km6^2 −

23045919081564150674462500000000000∗km6∗vm6 +

58765075084534710079212740000000000∗km6 −

27426122317664708166364753190875$0$∗vm6 +

344292854226063255906182144679007> 0 and

14874461480738533000000000000000000∗km6^2 +

23045919081564150674462500000000000∗km6∗vm6 +

34858601241721892618637260000000000∗km6 +

27426122317664708166364753190875$0$∗vm6 +

204229592127230907421112919138493> 0 and

10513937590889000000000000000000∗km6^2 −

7523902143790461100000000000000∗km6∗vm6 +

24639625336066459275580000000000∗km6 −

88162084036371465154867210000∗vm6 +

1443586504707401064403207055$69$> 0 and

23281144291110000000000000000000∗km6^2 +

7523902143790461100000000000000∗km6∗vm6 +

54559832390953851244200000000000∗km6 +

88162084036371465154867210000∗vm6 +

319655176020028238694137144$31$> 0 and km6 > 0 and vm6 > 0

In these results, the above-mentioned eight inequalities include the two parameters vm6 and km6, and indicate the quadratic inequality about km6. The quadratic of the left sides of these inequalities is factorized to obtain a product of two linear equations. Between the two linear equations, one is positive. Therefore, the other linear equation determines the feasible range of the two parameters vm6 and km6. The linear inequalities corresponding to these linear equations are the following eight inequalities.

G1=17686544435833911133310300000000*km6−
18142251291611838789962131296750*vm6+
20724387253652631651297901792133>0

G2=13279266973485764017539700000000*km6+
18142251291611838789962131296750*vm6+
15560115329571045928626360801367>0

G3=17748476058652550483612000000000*km6−
18142251291611838789962131296$75$*vm6+
20796956258819079006457750317$32$>0

G4=13217335350667124667238000000000*km6+
18142251291611838789962131296$75$*vm6+
15487546324404598573466512276$18$>0

G5=25075557096978967000000000*km6−
23405919081564150674462$50$*vm6+
29382537542267355039606$37$>0

G6=14874461480738533000000000*km6+
23405919081564150674462$50$*vm6+
17429300620860946309318$63$>0

G7=10513937590889000000000*km6−
7523902143790461$10000$*vm6+
12319812668033229637$79$>0

G8=23281144291110000000000+km6+
7523902143790461$10000$*vm6+
2727991619547692562$21$>0

Figure 14:
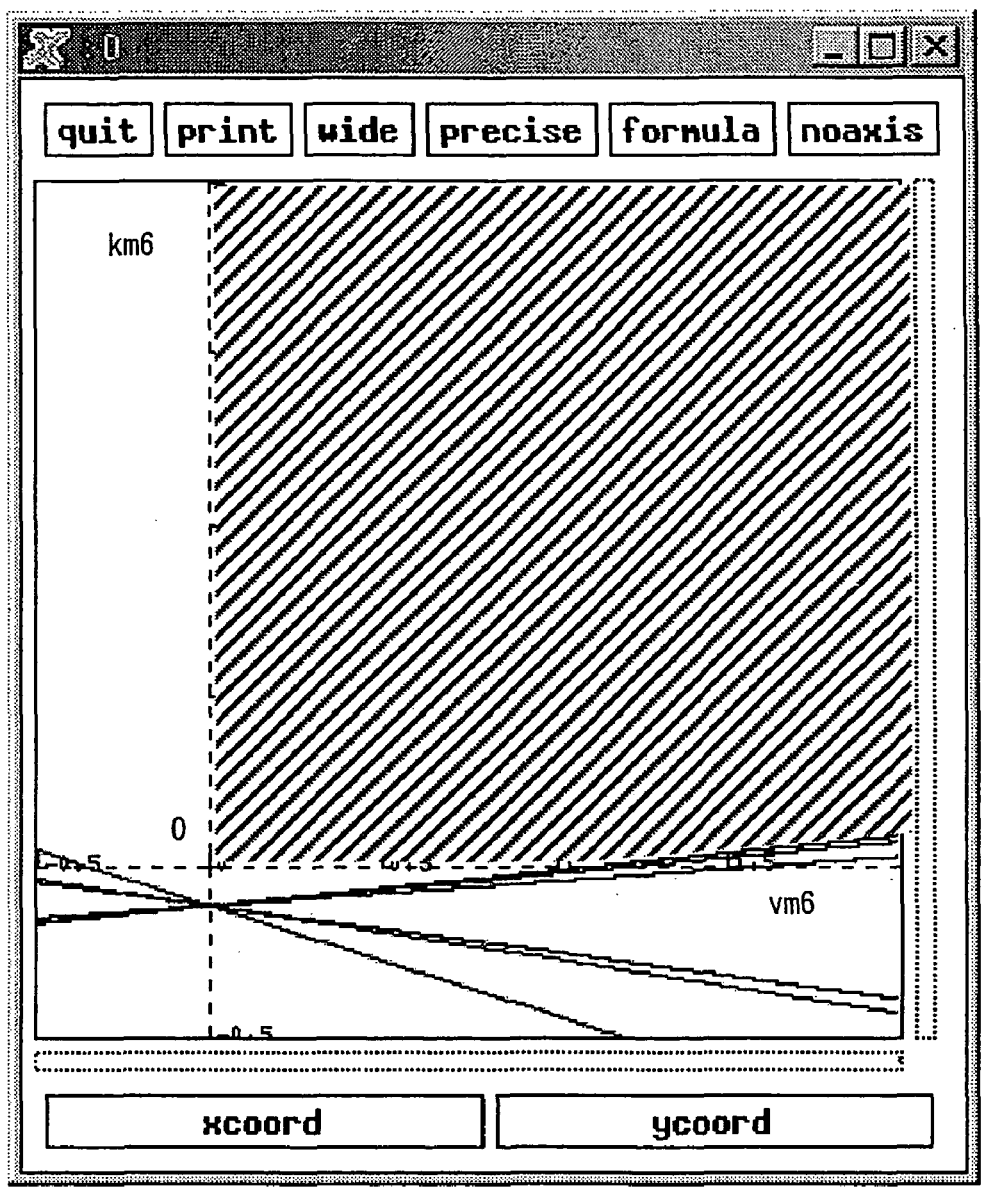
FIG. 14 shows a feasible area of a parameter according to the second embodiment.

FIG. 14 shows the display result of a feasible range of vm6 and km6 as a result of the second embodiment. In FIG. 14, as compared with the physically natural fact that the two parameters vm6 and km6 are positive, a practically ineffective result that a part of the first quadrant is cut off by a part of inequalities in the eight inequalities is obtained.

In the simulation, it is necessary to further select values from the two parameters vm6 and km6. The selection of the two parameters is explained below as the third embodiment. In the third embodiment, to further select values of the feasible range from the two parameters vm6 and km6, the smallest possible range of error for each concentration variable can be obtained by the QE algorithm. The absolute value of the variable indicating the range of error is defined as emax, and the constraint that an error for each concentration variable is between +emax and −emax is added. Under the conditions, the QE problem expressed by the following $\phi 3$ is considered. That is, the QE problem in the third embodiment is the same as the QE problem according to the first embodiment except the specification of the range of error by emax.

$\phi 3 = \exists\, vm6\ \exists\, km6\ \exists\, egap\ \exists\, ebpg\ \exists\, enadh2\ \exists\, enad(\tau)$ $\tau\,(vm6, km6, egap, ebpg, enadh2, enad, emax) =$ $(7523902143790461 0000 * vm6 +$ $(6421026010000000000000000 * egap -$ $4092911580889000000000)* km6 +$ $7523902143790461 000000 * egap -$ $4795910524242768 53779 = 0$ and $- 23405919081564150 67446250 * vm6 +$ $(1997500928858750000000000000 * ebpg +$ $5100547808120217000000000) * km6 +$ $23405919081564150 6744625000 * ebpg +$ $59766184607032043 6514387 = 0$ and $- 1814225129161183878 996213129675 * vm6 +$ $(15482905704659837 575425000000000000 * enadh2 +$ $22655703539927129 08187000000000) * km6 +$ $18142251291611838 78996213129675 00 * enadh2 +$ $26547049672072402 1649561902057 = 0$ and $18142251291611838 78996213129675 0 * vm6 +$ $(15482905704659837 5754250000000000 00 * enad -$ $22036387311740735 578853000000000) * km6 +$ $18142251291611838 78996213129675 000 * enad -$ $25821359620407928 61335770495383 = 0$ and $vm6 > 0$ and $km6 > 0$ and $emax > 0$ and $- emax < egap < emax$ and $- emax < ebpg < emax$ and $- emax < enadh2 < emax$ and $- emax < enad < emax$ When QE is applied to $\phi 3$, the range of error area of the variable emax without a quantifier is obtained as follows.

$55941746971386000000*emax-138482701358119397>0$

That is, if emax is larger than 1384827013581 19397/ 55941746971386000000=:0.00247548, it is stated that the constraint expression has a solution about vm6 and km6.

Therefore, the fourth embodiment is explained below by assuming that the range of error emax=0.005 to solve the QE problem $\phi 2$, that is, the QE problem in the second embodiment. As in the second embodiment, the result of obtaining a linear equation about the two parameters vm6 and km6 is shown below.

$R1 = 48725457917519961727989000000000*km6 - 907112564580591939498106 5648375*vm6 + 582663080392335612815841 8071879 > 0$ $R2 = 27689070605779226149136000000000*km6 + 907112564580591939498106 5648375*vm6 + 324449484188256326682264 7576496 > 0$ $R3 = 20014046412645263391799000000000*km6 - 362845025832236775799242 6259350*vm6 + 234516612260263192229533 6933789 > 0$ $R4 = 10951764996674411759051000000000*km6 + 362845025832236775799242 6259350*vm6 + 128328413571973583569708 9325561 > 0$ $R5 = 7544026226274796000000000*km6 - 117029 55407820753372 3125*vm6 + 88397890007426 3985118756 > 0$ $R6 = 24434784181545790000000000*km6 + 117029 55407820753372 3125*vm6 + 286317054003943 548604369 > 0$ $R7 = 7303424585889000000000*km6 - 752390214379046 110000*vm6 + 855786159613799 908779 > 0$ $R8 = 8823985758890000000000*km6 - 752390214379046 110000 * vm6 + 103395945234753 798779 < 0$

FIG. 15 shows the display result of the feasible range of the two parameters vm6 and km6 as the fourth embodiment. In FIG. 15, the feasible range of vm6 and km6, which is a hatched area, is much smaller in the first quadrant than that shown in FIG. 14.

Similarly, the selection of the feasible range of the two parameters vm6 and km6 using emax=0.0025 is explained below as the fifth embodiment of the present invention. In the fifth embodiment, as in the fourth embodiment, the QE algorithm is applied to the QE problem $\phi 2$, and the following linear inequality is obtained as in the fourth embodiment.

$L1 = 12148730314678065903483100000 0000*km6 - 3628450258322367757992426 2593500*vm6 + 1423539756988750511765260 6639141 > 0$ $L2 = 33341753899817716719419000000 000*km6 + 3628450258322367757992426 2593500*vm6 + 3906853721724333672309524 657609 > 0$ $L3 = 2454518712063068920817300000 0000*km6 - 725690051664473551598485 2518700*vm6 + 287610711604407996559446 0737903 > 0$ $L4 = 6420624288688985942677000000 000*km6 + 725690051664473551598485 2518700*vm6 + 752343142278287792397965 521447 > 0$ $L5 = 20188600260669809000000000000 *km6 - 46811838163128301348925 00*vm6 + 23656196462188484067518 99 < 0$ $L6 = 21359097181105900000000000000 *km6 - 46811838163128301348925 00*vm6 + 25027738062433339305649 > 0$ $L7 = 24876550783890000000000*km6 - 752390214379046110000*vm6 + 291493498829515326279 < 0$

FIG. 16 shows the display result of the feasible range of the two parameters vm6 and km6 as the fifth embodiment. In FIG. 16, the feasible range is exceedingly reduced, and is expressed as a substantially one bold line.

Figure 17:
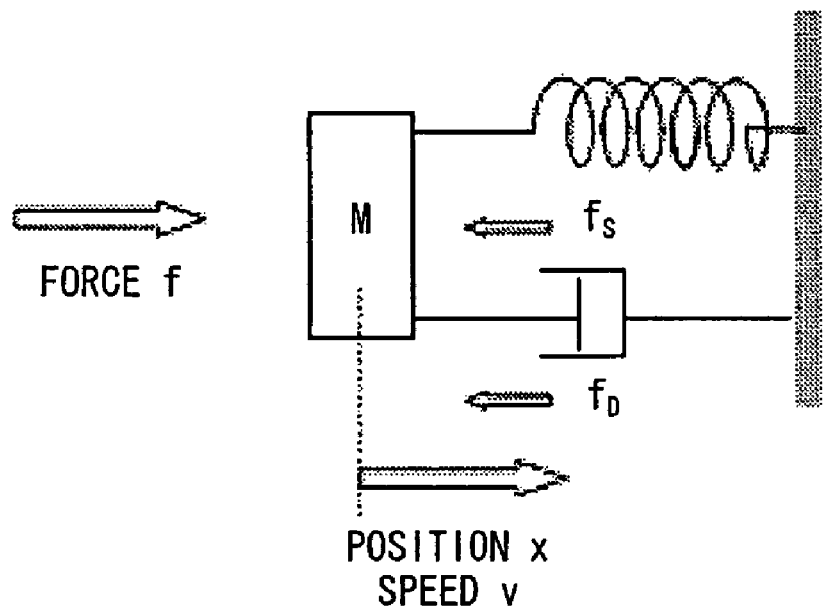
FIG. 17 shows the spring-mass-damper system as an example of a mechanical model.

The explanation of the embodiments of a biological system has been completed, and embodiments in other fields are explained below by referring to the mechanical system shown in FIG. 17. In FIG. 17, the sum of the inertial force of the mass M, the control force of the damper (viscosity constant D), and the force of a spring (coefficient k) is equal to the force f, and the following expression holds.

$$M\frac{dv}{dt} + Dv + kx = f \qquad \text{[Math 1]}$$

The following expression is obtained by substituting the position x (controlled variable) for the speed v.

$$M\frac{d^2x}{dt^2} + Dv + kx = f \qquad \text{[Math 2]}$$

For simplicity, the force (compulsory item, operation variable) is defined as 0, and for a difference expression, $$\begin{cases} x = y_0 \\ x' = \dfrac{dx}{dt} = y_1 \end{cases} \qquad \text{[Math 3]}$$

are used to obtain the following simultaneous ordinary differential equations.

$$\begin{cases} y'_0 = y_1 \\ y'_1 = (-D/M)y_1 + (-k/M)y_0 \end{cases} \qquad \text{[Math 4]}$$

The QE problem is considered to process the system. The mechanical system indicates a basic model frequently used as a similar problem in the control system, electronic circuit, biological system such as a viscoelastic film, etc.

FIG. 18 shows an experimental data and a simulation result for the mechanical system. These results are, as described above, based on f=0, M=1, t=0~20, Δt=0.1 increment, x and x'=v as experimental results (right), and x as simulation result (left).

As with a biological system, with t=4.9 and 5.0 indicated as two time points in FIG. 18, the following expression is obtained as a constraint expression including k and d (D), error variables e1 and e2, and the maximum absolute value emax of range of error.

$$\mu\,(k,d,e1,e2,emax) = (1 - d/10)*(467990039/1000000000) -$$
$$(k/10)*(-68652495/500000000) -$$
$$(113172839/250000000) + e1 = 0 \text{ and}$$
$$(1/10)*(467990039/1000000000) -$$
$$(6865249/500000000) -$$
$$(32334129/1000000000) + e2 = 0 \text{ and}$$
$$-emax < e1 < emax \text{ and}$$
$$-emax < e2 < emax \text{ and}$$
$$emax >= 0$$

The error variables e1 and e2 indicate the error in the two equations, but do not the error in each variable as in the above-mentioned biological system. Thus, the error variable can be set in each variable or in each equation in a constraint expression.

The QE is applied to the constraint expression. Practically, the following QE problem is considered as the sixth embodiment.

$$\phi4 = \exists k \exists d \exists e1 \exists e2(\mu)$$

In φ4, since no quantifier is assigned to emax, the QE algorithm determines the range of emax, and assigns the relationship between variables for other variables. The result is shown below.

$$10000000000 * emax - 7343769 > 0,$$
$$10000000000 * emax - 467990039 *$$
$$d = \frac{epsilon1 + 13730498 * k + 152986830}{467990039},$$
$$e1 = \frac{10000000000 * emax - 46799039 * epsilon1}{10000000000},$$
$$e2 = \frac{-7343769}{10000000000}$$

where epsilon 1 indicates a positive infinitesimal.

Since the range of emax is obtained as a result of the sixth embodiment, a constraint expression is generated using a value of emax a little larger than the limit value, and a QE problem is expressed with a quantifier added to e1 and e2 as the seventh embodiment of the present invention finally explained below.

The constraint expression is expressed as follows.

λ(k,d,e1,e2)=(1−d/10)*(467990039/1000000000)−(k/10)*(−6865249/500000000) −(113172839/250000000)+e1=0 and (1/10)*(467990039/1000000000)+(−6865249/500000000)−(32334129/1000000000)+e2=0 and −7343770/10000000000<e1<7343770/10000000000 and −7343770/10000000000<e2<7343770/10000000000 and k>0 and d>0

The QE problem in the seventh embodiment is $$\phi5 = \exists e1 \exists e2(\lambda)$$

The QE algorithm provides the following result.

467990039*d−13730498*k−145643060>0 and
467990039*d−13730498*k−160330600<0 and
d>0 and k>0, $$e1 = \frac{467990039*d - 13730498*k - 152986830}{10000000000},$$
$$e2 = \frac{-7343769}{10000000000}$$

Figure 19:
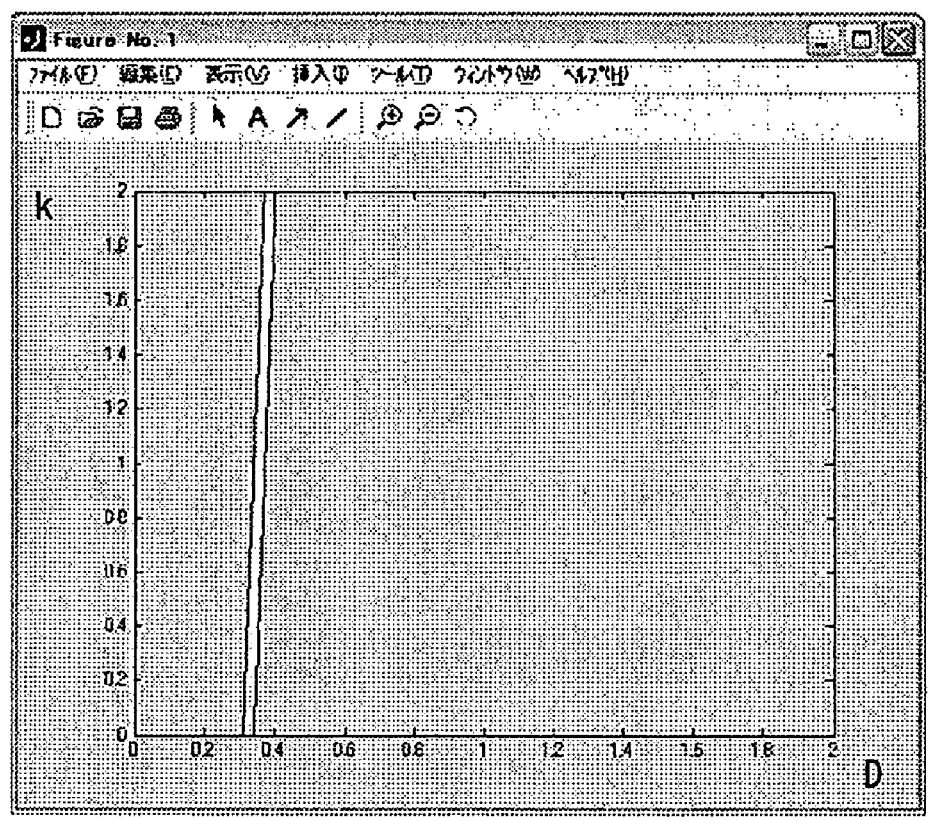
FIG. 19 shows a feasible area of a parameter according to the seventh embodiment.

In the above-mentioned four inequalities, the feasible area of k and d (D) are assigned. FIG. 19 shows the range. In FIG. 19, the feasible area of k and D is shown as a range very small between two lines in the first quadrant.

Figure 20:
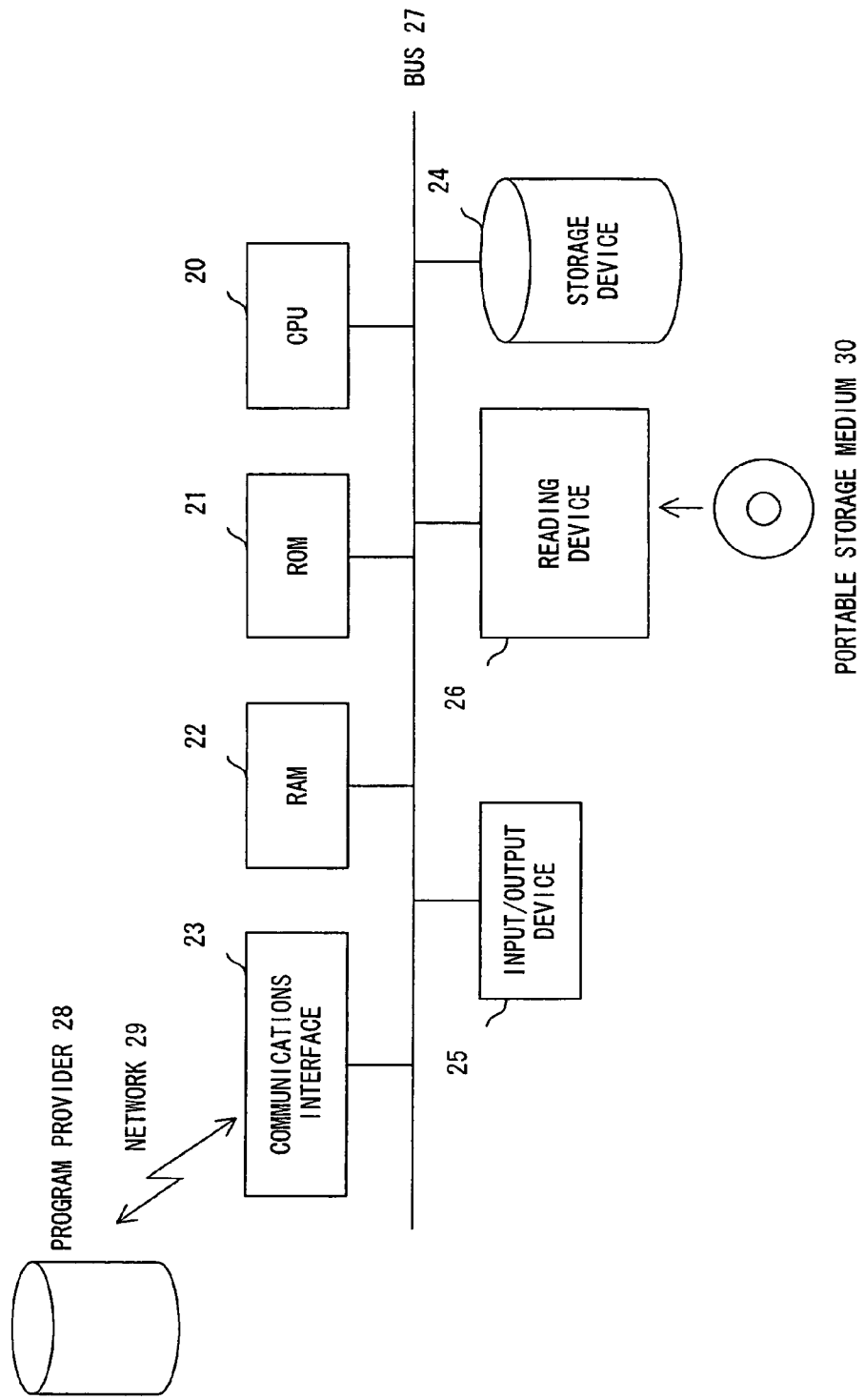
FIG. 20 is an explanatory view of loading a program into a computer to realize the present invention.

In the explanation above, the model parameter determination program to be stored in a storage medium, a determining method, and a determination apparatus are described in detail. It is obvious that the program can be executed by a common computer system. FIG. 20 is a block diagram of the configuration of the computer system, that is, a hardware environment.

In FIG. 20, the computer system comprises a central processing unit (CPU) 20, read only memory (ROM) 21, random access memory (RAM) 22, a communications interface 23, a storage device 24, an input/output device 25, a read device 26 of a portable storage medium, and a bus 27 for connecting all these components.

The storage device 24 can be various storage devices such as a hard disk, a magnetic disk, etc. These storage device 24 or ROM 21 stores a program indicated in the flowcharts shown in FIGS. 2, 7, and 13. The program is executed by the CPU 20, thereby determining the presence/absence of a solution, detecting the range of a feasible parameter, and obtaining new findings about a system.

The above-mentioned program can be stored in, for example, the storage device 24 from a program provider 28 through the network 29 and the communications interface 23, or stored on a marketed and distributed portable storage medium 30, set in the read device 26, and executed by the CPU 20. The portable storage medium 30 can be various storage media such as CD-ROM, a flexible disk, an optical disk, a magneto-optical disk, etc. The program stored in these media can be read by the read device 26 to determine the model parameter in the embodiments of the present invention.

The present invention can be applied not only in the industries requiring a simulation of a biological system and bioengineering, but also useful in all industries for processing a system described in the first order predicate logic expression.

What is claimed is:

1. A computer-readable storage medium storing a model parameter determination program used to direct a computer to perform a process, the process comprising:
    receiving, through an input device, input of variable data based on a result of a simulation or an experiment performed based on a model of a system to be analyzed;
    generating, by a formulation unit, a first constraint expression relating to a parameter of the model based on the received variable data and the model of the system, an error variable corresponding to the received variable data and a variable indicating a range of the error variable, and storing the expression in a storage;
    obtaining, by a quantifier elimination unit, a possible range of the variable indicating the range of the error variable as an emax by applying a quantifier elimination algorithm to the first constraint expression;
    generating, by the formulation unit, a second constraint expression by substituting emax for the variable indicating a range of the error variable in the first constraint expression;
    obtaining, by the quantifier elimination unit, presence/absence of a solution and/or a possible range of a feasible parameter by applying a quantifier elimination algorithm to the second constraint expression; and
    displaying the presence/absence of a solution and/or the possible range of a feasible parameter on a display.

2. The storage medium according to claim 1, wherein variable data at a plurality of time points are used as variable data.

3. The storage medium according to claim 1, further comprising displaying a possible range of the feasible parameter on an output device.

4. The storage medium according to claim 1, further comprising outputting to an output device new findings about a system including a sample solution, a condition expression between variables or a model, or a relational expression between parameters based on an application result of a quantifier elimination algorithm for the constraint expression.

5. The storage medium according to claim 1, wherein in addition to a parameter of the model of a constraint expression, the constraint expression includes an error variable corresponding to each equation in the constraint expression.

6. The storage medium according to claim 1, wherein the system to be analyzed is a biological system.

7. The storage medium according to claim 1, wherein the system to be analyzed is a physical system represented by an ordinary differential equation including a mechanical system.

8. A computer-readable storage medium storing a model parameter determination program used to direct a computer to perform a process comprising:
    receiving input of variable data on a model of a system;
    generating a first constraint expression relating to a parameter of a model based on the received data and the model of the system, an error variable corresponding to the received variable data and a variable indicating a range of the error variable, and storing the expression in a storage;
    obtaining a possible range of the variable indicating the range of the error variable by applying a quantifier elimination algorithm to the first constraint expression;
    generating a second constraint expression by substituting an absolute value of the variable indicating the range of the error variable for the variable indicating a range of the error variable in the first constraint expression; and
    obtaining presence/absence of a solution and/or a possible range of a feasible parameter by applying a quantifier elimination algorithm to the second constraint expression using the absolute value of the obtained possible range of the variable indicating the range of the error variable as a range of the error variable obtained using the first constraint expression.

9. A model parameter determination apparatus which determines a model parameter in a simulation of a system, comprising:
    a storage;
    a data input unit receiving input of variable data based on a result of a simulation or an experiment performed based on a model of a system to be analyzed;
    a constraint expression generation unit generating a constraint expression relating to a parameter of a model based on the received data and the model of the system an error variable corresponding the received variable data and a variable indicating a range of the error variable, and storing the expression in the storage;
    a quantifier elimination unit obtaining a possible range of the variable indicating the range of the error variable by applying a quantifier elimination algorithm to the first constraint expression;
    the constraint expression generation unit generating a second constraint expression by substituting an absolute value of the variable indicating the range of the error variable for the variable indicating a range of the error variable in the first constraint expression; and
    a parameter determination unit obtaining presence/absence of a solution and/or a possible range of a feasible parameter by applying a quantifier elimination algorithm to the second constraint expression using the obtained absolute value of possible range of the variable indicating the range of the error variable as a range of the error variable.

10. The apparatus according to claim 9, further comprising a display unit displaying a possible range of the obtained feasible parameter.

11. A model parameter determining method for determining a model parameter in a simulation of a system, comprising:
- receiving, through an input device, input of variable data based on a result of a simulation or an experiment performed based on a model of a system to be analyzed;
- generating, by a formulation unit, a first constraint expression relating to a parameter of a model based on the received data and the model of the system, an error variable corresponding the received variable data and a variable indicating a range of the error variable, and storing the expression in a storage;
- obtaining, by a quantifier elimination unit, a possible range of the variable indicating the range of the error variable by applying a quantifier elimination algorithm to the first constraint expression;
- generating, by the formulation unit, a second constraint expression by substituting an absolute value of the variable indicating the range of the error variable for the variable indicating a range of the error variable in the first constraint expression; and
- obtaining, by a quantifier deletion unit, presence/absence of a solution and/or a possible range of a feasible parameter by applying a quantifier elimination algorithm to the second constraint expression using the obtained absoluter value of the possible range of the variable indicating the range of the error variable as a range of the error variable.

12. A model parameter determining method as recited in claim 11, further comprising using the quantifier elimination algorithm to determine a maximum value of the error variable.

13. A model parameter determining method as recited in claim 12, further comprising substituting the maximum value of the error variable for the constraint expression and using the quantifier elimination algorithm to determine the feasible parameter.

14. A method, comprising:
- inputting a result of a simulation of or an experiment performed based on a model of a system to be analyzed;
- generating a first constraint expression relating to a parameter of the model using the model, the result of the simulation and an error variable corresponding to a variable of the model and a variable indicating a range of the error variable, and by adding an expression including parameters for which a feasible range is obtained and an expression of assigning a practical range to the variable;
- obtaining a possible range of the variable indicating the range of the error variable by applying a quantifier elimination algorithm to the first constraint expression;
- generating a second constraint expression by substituting the value of the possible range in the first constraint expression;
- determining a presence/absence of a solution and/or a possible range of a feasible parameter by applying a quantifier elimination algorithm to the second constraint expression using the possible range; and
- storing, in a memory, the presence/absence of the solution and/or the possible range of the feasible parameter.

* * * * *